United States Patent [19]

Bahn

[11] Patent Number: 5,260,635

[45] Date of Patent: Nov. 9, 1993

[54] RELUCTANCE MOTOR

[75] Inventor: Itsuki Bahn, Tokyo, Japan

[73] Assignee: Kabushikigaisha Sekogiken, Tokyo, Japan

[21] Appl. No.: 984,733

[22] Filed: Dec. 4, 1992

Related U.S. Application Data

[63] Continuation of Ser. No. 499,322, Aug. 1, 1990, abandoned.

[30] Foreign Application Priority Data

Oct. 7, 1988 [JP] Japan .................. 63-251855
Oct. 24, 1988 [JP] Japan .................. 63-266114
May 19, 1989 [JP] Japan .................. 1-124406

[51] Int. Cl.⁵ .................................. H02P 8/00
[52] U.S. Cl. .................................... 318/701
[58] Field of Search ............. 318/701, 254, 646, 706, 318/720, 721, 138; 310/31, 264, 168, 35

[56] References Cited

U.S. PATENT DOCUMENTS

| | | | |
|---|---|---|---|
| 4,030,005 | 6/1975 | Doemen | 318/138 |
| 4,520,302 | 5/1985 | Hill et al. | 318/696 |
| 4,584,513 | 4/1986 | Freise et al. | 318/701 |
| 4,684,867 | 8/1987 | Miller et al. | 318/701 |
| 4,868,478 | 9/1989 | Hedlund et al. | 318/696 |
| 4,896,088 | 1/1990 | Jahns | 318/701 |
| 4,933,621 | 6/1990 | MacMinn et al. | 318/701 |
| 5,097,191 | 3/1992 | Bahn | 318/701 |

FOREIGN PATENT DOCUMENTS 54-18018 9/1979 Japan .

Primary Examiner—William M. Shoop, Jr.
Assistant Examiner—John W. Cabeca
Attorney, Agent, or Firm—Staas & Halsey

[57] ABSTRACT

A reluctance motor is provided which is small-sized and inexpensive, yet excellent in various operating characteristics such as a capability of highspeed operation, and which can be driven with a battery power supply and thus can be used as a drive source for various devices.

A current supply control circuit is supplied with first- to third-phase position detection signals which are continuous but not superposed one upon another in time, from a position detection device having three detection coils for detecting the position of a rotor, and supplies an electric current sequentially to first- to third-phase exciting coil pairs (K-L) in accordance with the received position detection signals: When one position detection signal is extinguished and thus the current supply to the exciting coil pair relating to this signal is interrupted, the magnetic energy stored in this exciting coil pair is discharged and supplied to another exciting coil pair to which an electric current is supplied in response to another position detection signal generated at the extinction of the first-mentioned position detection signal. Accordingly, the magnetic energy stored in the exciting coil pair for which the current supply is interrupted is quickly extinguished, while the exciting current flowing through the exciting coil pair for which the current supply is started is quickly raised, whereby a reduction of torque and a counter-torque caused respectively at an initial stage and a last stage of the current supply are eliminated, thus permitting a high-speed operation of the motor.

21 Claims, 24 Drawing Sheets

MECHANICAL ANGLE

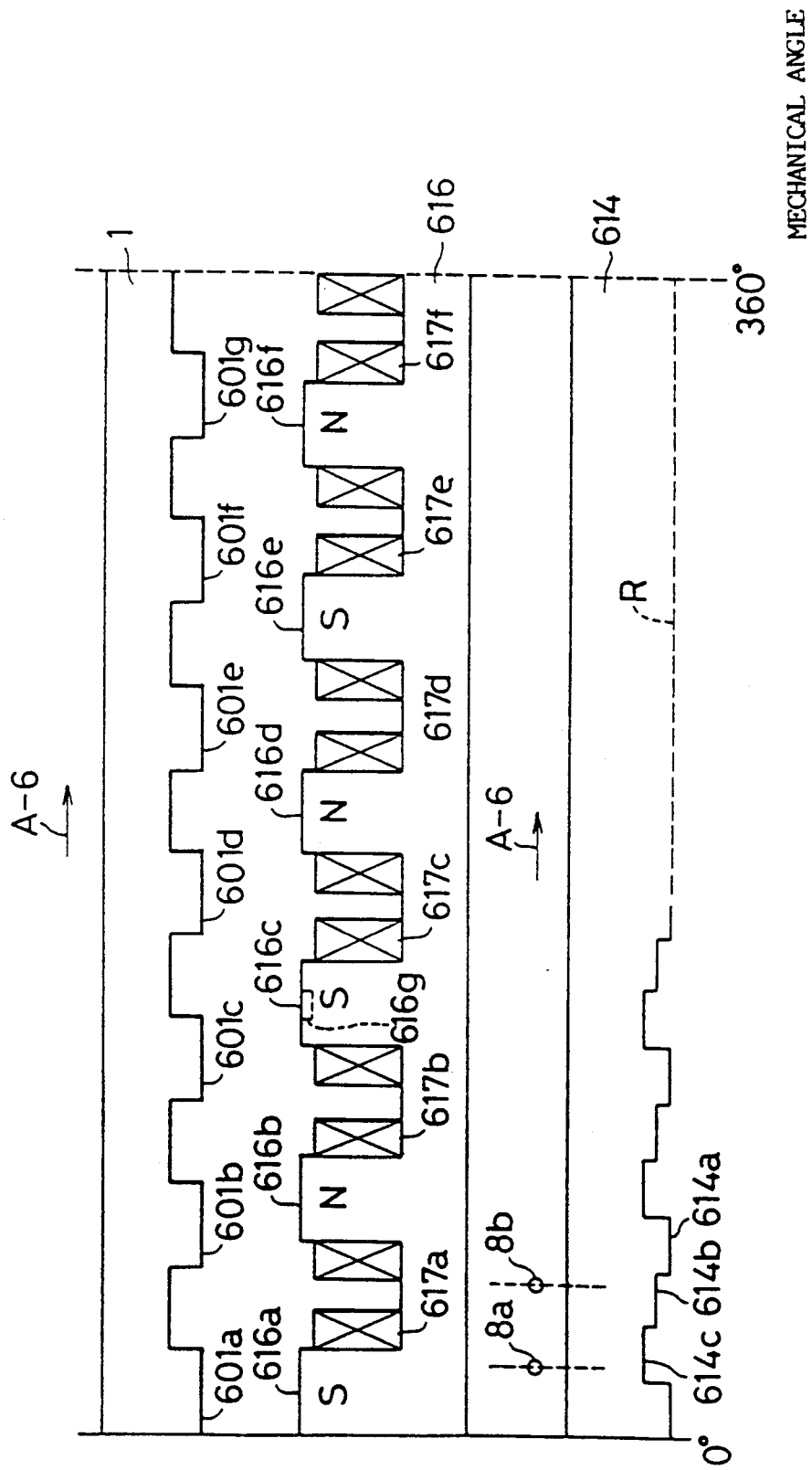

FIG.28
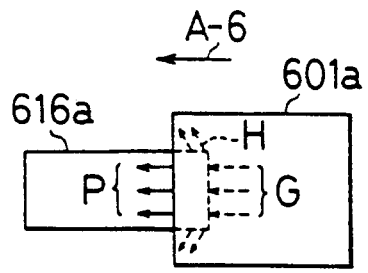
FIG.30
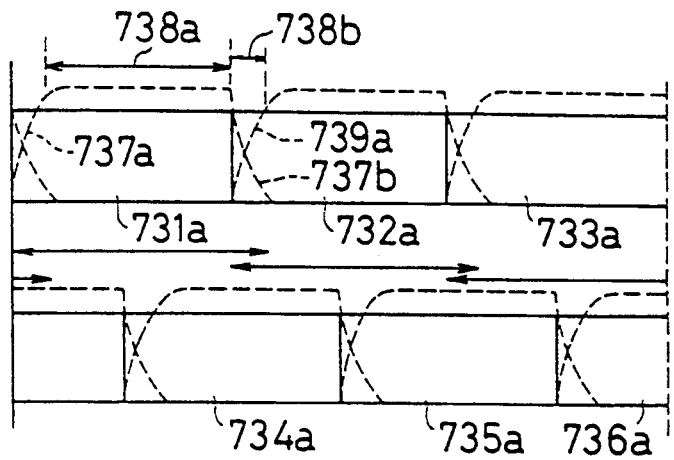
FIG.31
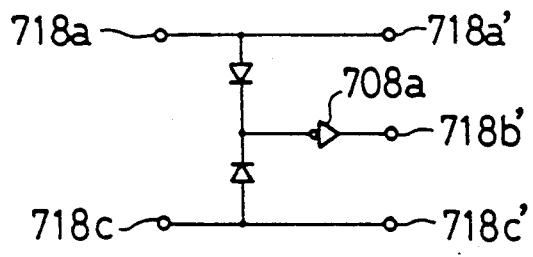
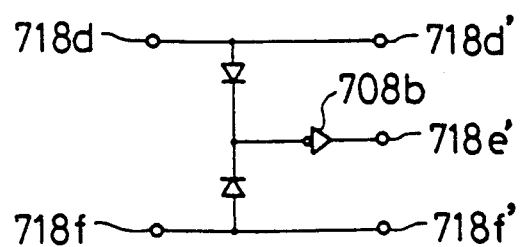

RELUCTANCE MOTOR

This application is a continuation of application Ser. No. 07/499,322, filed Aug. 1, 1990, now abandoned.

TECHNICAL FIELD

This invention relates to a reluctance motor, and more particularly, to a reluctance motor for use in a variety of applications in place of conventional induction motors and semiconductor motors (brushless motors).

BACKGROUND ART

There has been known a reluctance motor which comprises a stator having a plurality of magnetic poles, and a rotor rotatably supported in concentricity with the stator and having a plurality of salient poles, and in which the rotor is rotated by a magnetic attractive force produced between the magnetic poles of the stator, which are sequentially excited, and the salient poles of the rotor opposed thereto. Reluctance motors are, however, disadvantageous in that their application is limited. Namely, there are examples that a reluctance motor is practically used as a direct-drive type drive source for a robot arm, and as a small-sized stepping motor, but it is difficult to employ a reluctance motor for an application requiring high-speed rotation, an automobile drive power source having a battery as a power supply, or the like.

More specifically, in reluctance motors, the exciting coils have a large inductance and the magnetic energy stored in the exciting coils is extremely large. Accordingly, substantial time is required for the storage and extinction of the energy, thus delaying the rise and fall of the current and causing a reduced-torque (reduction in torque) and a counter-torque. The reduced-torque and the counter-torque increase with an increase in the rotation speed of the motor. Further, in reluctance motors, the number of times the magnetic energy is stored and discharged per magnetic pole during one rotation of the rotor is large as compared to a three-phase Y-connection type direct current motor. Due to the inductance of the exciting coils, the exciting current is increased at the last stage of the current supply to the exciting coils, and the current supply in this stage does not contribute to the generation of output torque, causing a large Joule loss. As a result, the efficiency of the motor is lowered and the rotational speed is extremely reduced. If, in particular, the number of salient poles and magnetic poles is increased or the gaps between the salient poles and the magnetic poles are reduced, with a view to increasing the output torque of the motor, the rotational speed is significantly decreased. Namely, in such a case, the time required for the rise and fall of the exciting current is further lengthened due to the stored magnetic energy. Also, in the case of increasing the exciting current or using a battery of about 12 to 24 volts as a power supply, the rotational speed of the motor is reduced.

Furthermore, while the torque curve (based on N and S magnetic poles) of a direct current motor having a magnet rotor is symmetrical, that of a reluctance motor is asymmetrical. Namely, in reluctance motors, an extremely large torque is produced when the salient pole approaches a magnetic pole, whereas the torque produced when the salient pole moves away from a magnetic pole is small, and therefore, the output torque of the motor is subject to pulsation. If, following the ordinary operating technique of direct current motors, a reluctance motor capable of producing an output torque proportional to the exciting current even in a state in which the magnetic flux passing the magnetic pole is saturated is used to permit an operation in a magnetic flux-saturated state, the inductance of the exciting coil is varied largely before and after the saturation of the magnetic flux, making it difficult to control the exciting current.

To increase the output torque of a reluctance motor, if the number of magnetic poles and salient poles is increased, the structure of the motor becomes complicated, bidirectional current supply to the exciting coils cannot be effected, and a plurality of systems are required for the exciting coils, making it necessary to use an expensive current supply control circuit. Furthermore, if a converter or inverter, for example, is used for a direct current power source device to rectify the output from an alternating current power supply, the motor is increased in size and in cost. In addition, only those portions of the input alternating current voltage near the peak value thereof are used for the current supply, namely, a pulsed current having a high crest value is supplied, and accordingly, a large electrical noise is produced at the start and interruption of the current supply, and a smoothing capacitor having a large capacitance, accordingly, large-sized and expensive, is required. The pulsed current supply entails a burden on the power feed side and thus is undesirable.

Moreover, in reluctance motors, a large magnetic attractive force which does not contribute to the generation of the output torque is produced between the magnetic poles and the salient poles and causes a vibration.

DISCLOSURE OF THE INVENTION

An object of this invention is to provide a reluctance motor which is small-sized and inexpensive, excellent in various operating characteristics, such as a capability of high-speed operation, yet operable with a battery as a power supply, and accordingly can be used as a drive source for various apparatuses.

To achieve the above object, according to this invention, there is provided a reluctance motor including a rotor having a plurality of salient poles, and an armature having a plurality of magnetic poles to which exciting coils are respectively fitted, the reluctance motor comprising a position detection device for sequentially delivering position detection signals corresponding in number to the exciting coils, in accordance with a rotational position of the rotor, a current supply control circuit connected to a direct current power supply, for supplying an electric current sequentially to the exciting coils in accordance with the position detection signals, and circuit means which, when the current supply to each of the exciting coils in interrupted, causes magnetic energy stored in that exciting coil for which the current supply is interrupted, to flow into another exciting coil for which the current supply is started at the time of interruption of the current supply, to thereby quickly extinguish the stored magnetic energy and quickly raise an exciting current flowing through the exciting coil.

As described above, according to this invention, the magnetic energy stored in the exciting coil for which the current supply is interrupted is supplied to another exciting coil for which the current supply is started, to thereby quickly extinguish the magnetic energy stored in the former exciting coil and enable a prompt rise of the exciting current supplied to the latter exciting coil, whereby occurrence of a counter-torque due to the stored magnetic energy and reduction in torque (occurrence of reduced-torque) due to a delayed rise of the exciting current can be prevented. Accordingly, a reluctance motor having excellent characteristics, such as a capability of high-speed operation, can be provided.

BRIEF DESCRIPTION OF THE DRAWINGS

FIG. 23 is a development showing a rotor and an armature in FIG. 22;

FIG. 28 is a diagram illustrating the principle of generating torque between rotor salient poles and armature magnetic poles in FIG. 22;

FIG. 30 is a graph showing changes of an exciting current according to the ninth embodiment;

FIG. 31 is a partial circuit diagram showing a modification of the position detection device, provided in the motor of the ninth embodiment;

BEST MODE OF CARRYING OUT THE INVENTION

Figure 1:
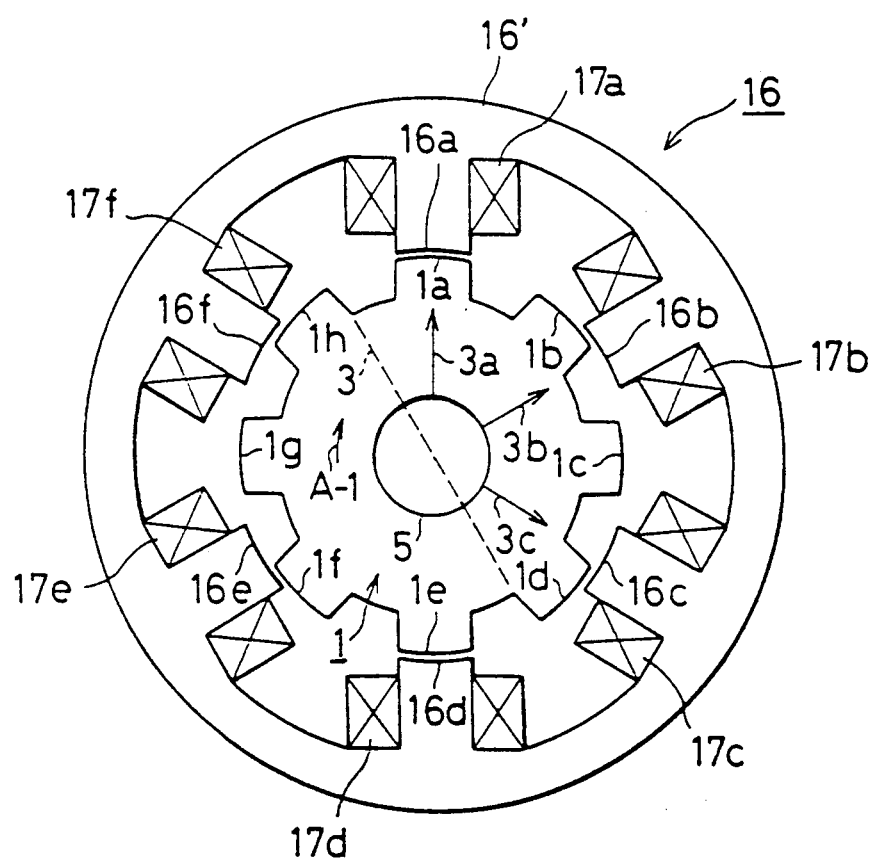
FIG. 1 is a schematic sectional view of a three-phase half-wave reluctance motor according to a first embodiment of this invention.

A three-phase half-wave reluctance motor according to a first embodiment of this invention has a main body as shown in FIG. 1. The main body of the motor comprises a rotor 1 securely fitted on a rotary shaft 5 rotatably supported by bearings (not shown) provided in an unillustrated outer casing, and an armature (stator) 16 secured to the casing coaxially with the rotor, these two elements being each made of a laminate of silicon steel plates, as known in the art. The rotor 1 has eight salient poles 1a to 1h formed on the outer peripheral surface thereof equidistantly in the circumferential direction with a phase difference of 360 degrees (electrical angle) between each other and each having a width corresponding to an electrical angle of 180 degrees (hereinafter, various angular parameters are expressed in the electrical angle). The stator 16 has an annular magnetic core 16' for forming magnetic paths, and six magnetic poles 16a to 16f each having a width of 180 degrees are formed on the inner peripheral surface of the magnetic core at equal distances in the circumferential direction such that the magnetic poles can be opposed to the salient poles 1a to 1h with a gap of 0.1 to 0.2 mm, e.g., about 0.15 mm, therebetween. Exciting coils 17a to 17f are respectively fitted on the magnetic poles 16a to 16f. The exciting coils 17a and 17d are connected in series, and this pair will hereinafter be called a first-phase exciting coil pair K. The exciting coils 17b and 17e and the exciting coils 17c and 17f are connected in a similar fashion, and will hereinafter be called second- and third-phase exciting coil pairs L and M, respectively.

To attain the effect of eliminating a rotational vibration described later, of these pairs of exciting coils respectively arranged symmetrically about the rotary shaft 5, the number of winding of one exciting coil in each pair is made larger than that of the other exciting coil in the same pair by a predetermined number. Further, the opposed faces of the salient poles 1a to 1h and the magnetic poles 16a to 16f are different in width along the rotary shaft, to permit a leakage flux to be generated between the opposed faces and thereby make the output curve (mentioned later) of the motor even.

Figure 3:
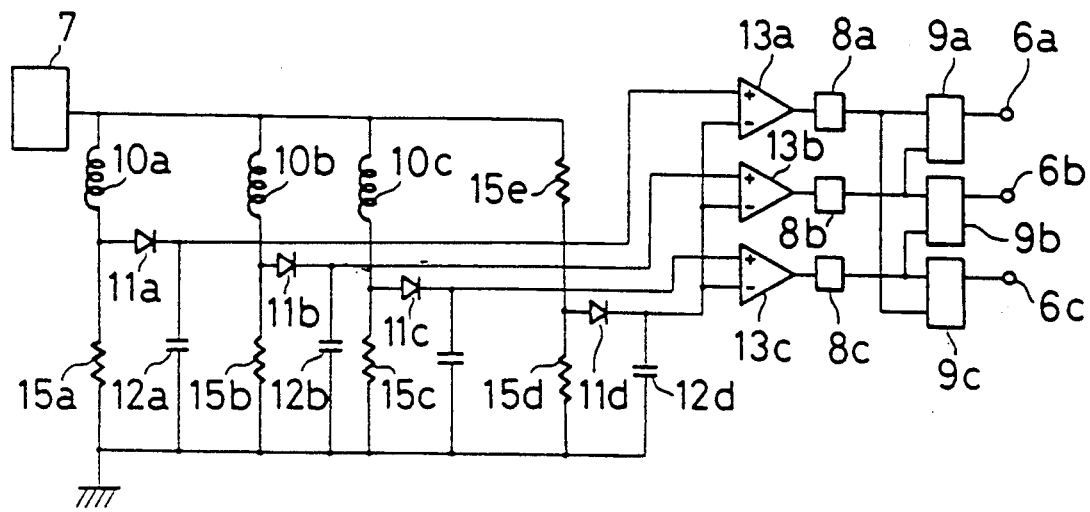
FIG. 3 is a schematic circuit diagram showing a position detection device used with the motor of FIG. 1.

The motor further comprises a position detection device shown in FIG. 3. The position detection device includes three position detecting elements 10a to 10c (FIG. 3) each having a diameter of 5 mm and comprising an air-core coil of about 100 turns, for detecting the rotational position of the salient poles 1a to 1h of the rotor 1. These detecting elements (hereinafter referred to as detection coils) are secured to the armature 16 at regular intervals of 120 degrees such that the coil faces thereof can be opposed to the side surfaces of the salient poles 1a to 1h with a gap therebetween. The position detection device further comprises an oscillator 7 with an oscillation frequency of about 1 to 5 MHz, the output side of which is connected to a bridge circuit composed of the detection coils 10a to 10c and resistors 15a to 15e. The bridge circuit is adjusted such that it is in equilibrium when none of the coils 10a to 10c are opposed to the salient poles 1a to 1h of the rotor 1. The bridge circuit is connected to flip-flop circuits (hereinafter referred to as FF circuits) 9a to 9c through low-pass filters composed of diodes 11a to 11d and capacitors 12a to 12d, operational amplifiers 13a to 13c, and differentiating circuits 8a to 8c, respectively.

More specifically, the anodes of the diodes 11a to 11c are connected to connection nodes between the coils 10a to 10c and the resistors 15a to 15c, respectively, and the cathodes thereof are connected to respective ends of the capacitors 12a to 12c, which have other ends grounded, and also connected to respective positive input terminals of the operational amplifiers 13a to 13c. The anode of the diode 11d is connected to a connection node between the resistors 15d and 15e, and the cathode thereof is connected to one end of the capacitor 12d which is grounded at the other end, and also connected to the negative input terminals of the operational amplifiers 13a to 13c. The output terminals of the operational amplifiers 13a to 13c are respectively connected to the input terminals of the differentiating circuits 8a to 8c, the output terminals of which are respectively connected to the set input terminals of the FF circuits 9a to 9c as well as to the corresponding reset input terminals of same. The set output terminals of the FF circuits 9a to 9c are respectively connected to output terminals 6a to 6c of the position detection device.

Figure 4:
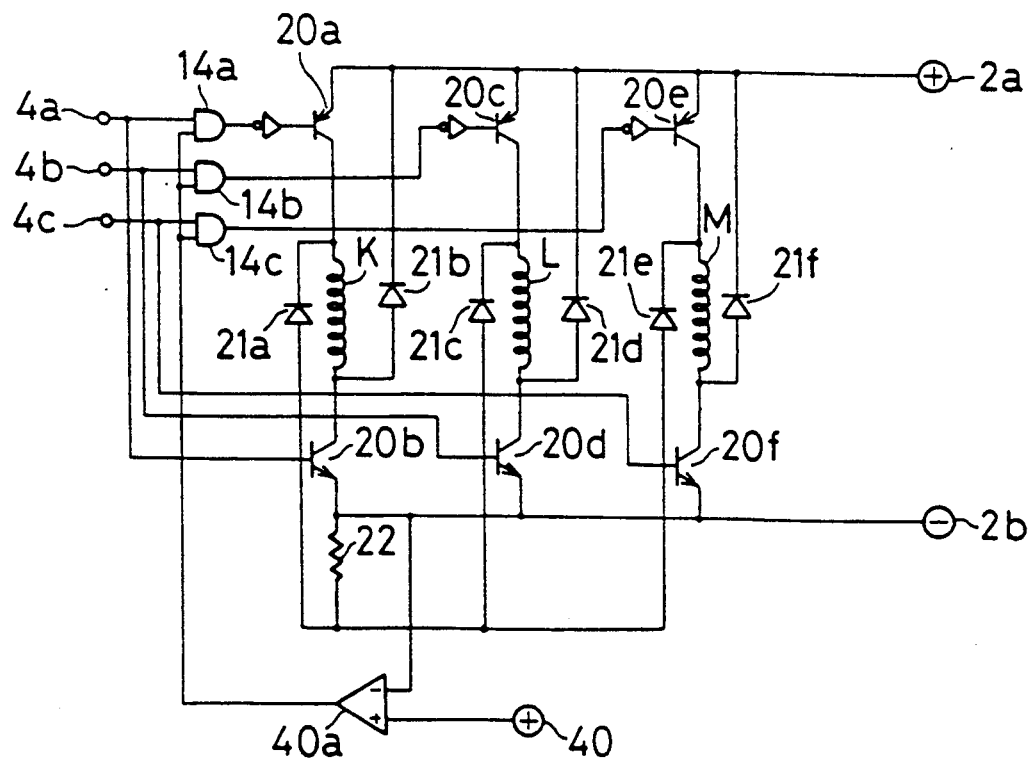
FIG. 4 is a schematic circuit diagram showing a current supply control circuit used with the position detection device of FIG. 3.

The motor further comprises a current supply control circuit shown in FIG. 4, for effecting and interrupting supply of an exciting current to the exciting coils 17a to 17f of the armature 16, i.e., the first- to third-phase exciting coil pairs K to M.

Input terminals 4a to 4c of the current supply control circuit are respectively connected to the output terminals 6a to 6c of the aforesaid position detection device, and also connected to respective input terminals of AND circuits 14a to 14c of the current supply control circuit. The other input terminal of each of these AND circuits is connected to a reference voltage input terminal 40, to which a reference voltage is applied for variable control of the motor output torque, through an operational amplifier 40a which forms a chopper circuit in cooperation with the AND circuits. The output terminals of the AND circuits 14a to 14c are respectively connected through inverters to the bases of transistors (switching elements) 20a, 20c and 20e connected between a positive terminal 2a of a direct current power supply and the respective ends of the first- to third-phase exciting coil pairs K to M. The other ends of the first- to third-phase exciting coil pairs are connected to a negative terminal 2b of the direct current power supply and the negative input terminal of the operational amplifier 40a, through transistors 20b, 20d and 20f, respectively. To the emitters of the transistors 20b, 20d and 20f is connected one end of a resistor 22 for detecting the exciting current flowing through the first- to third-phase exciting coil pairs, the other end of the resistor being connected to the anodes of diodes 21a, 21c and 21e. The cathodes of these diodes are connected to respective ends of the first- to third-phase exciting coil pairs K to M, which are connected at the other end to the positive terminal of the direct current power supply through diodes 21b, 21d and 21f, respectively.

The operation of the reluctance motor having the above-described construction will be now described.

The bridge circuit of the position detection device (FIG. 3) provided in the motor is in equilibrium when none of the detection coils 10a to 10c are opposed to the salient poles 1a to 1h of the rotor 1. Accordingly, when the detection coil 10a is not opposed to any of the salient poles, the output of the low-pass filter composed of the diode 11a and the capacitor 12a is equal to the output of the low pass filter composed of the diode 11d and the capacitor 12d, and therefore, the operational amplifier 13a generates a low-level output. In practice, however, when the rotation of the motor is stopped, any one of the detection coils is opposed to one of the salient poles. When the detection coil 10a, for example, is opposed to one salient pole, the impedance of the detection coil 10a is decreased due to the iron loss (eddy-current loss plus hysteresis loss) and thus the voltage drop at the resistor 15a becomes large, whereby the voltage applied to the positive input terminal of the operational amplifier 13a is increased and the output 25 of the same amplifier becomes high-level (the output is shown at 25a and 25b in FIG. 6). Namely, as the rotor 1 rotates, a rectangular-wave signal 25 is output from the operational amplifier 13a.

Figure 6:
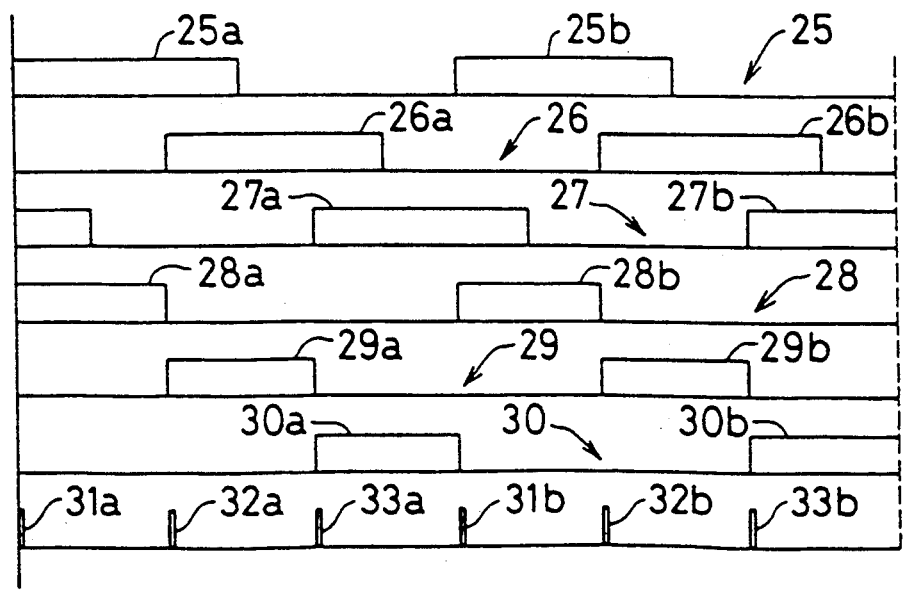
FIG. 6 is a timing chart showing changes of various signals of the position detection device in FIG. 3 with time.

Also, when the detection coils 10b and 10c are opposed to the side surfaces of any of the salient poles 1a to 1h, the voltage drops at the resistors 15b and 15c respectively become large, and accordingly, the outputs 26 and 27 (FIG. 6) of the operational amplifiers 13b and 13c become high-level due to an increase of the input voltages applied thereto through the low-pass filters 11b, 12b and 11c, 12c (the outputs are shown at 26a, 26b, 27a and 27b in FIG. 6). Accordingly, with rotation of the rotor 1, rectangular-wave signals 26 and 27 are respectively output from the operational amplifiers.

The above rectangular-wave signals 25 to 27 are shifted in phase from each other by 120 degrees.

The differentiating circuits 8a to 8c generate pulse signals (indicated at 31a, 31b, 32a, 32b, 33a and 33b in FIG. 6) upon detecting the rise of the outputs 25 to 27 of the operational amplifiers. The FF circuits 9a to 9c, to which these pulse signals are input, are reset when the power of the motor is turned on, and accordingly low-level outputs appear at the output terminals 6a to 6c of the position detection device. When, thereafter, a high-level output 25a is supplied from the operational amplifier 13a, a pulse signal 31a is generated and a high-level output appears at the output terminal 6a. When a high-level output 26a is delivered from the operational amplifier 13b during the course of rotation of the motor, a pulse signal 32a is supplied to the reset input terminal of the FF circuit 9a, whereby the output from the output terminal 6a of the position detection device becomes low-level. Simultaneously, the pulse signal 32a is supplied to the set input terminal of the FF circuit 9b, and therefore, the output from the terminal 6b becomes high-level. When a pulse signal 33a is thereafter generated and supplied to the reset input terminal of the FF circuit 9b and the set input terminal of the FF circuit 9c, the outputs from the terminals 6b and 6c become low-level and high-level, respectively. Namely, with rotation of the motor, rectangular-wave outputs, i.e., signals representing the positions of the salient poles of the rotor relative to the first- to third-phase exciting coil pairs K to M, are delivered from the output terminals 6a to 6c of the position detection device. (These signals are indicated by curves (rectangles) 28 to 30 in FIG. 6 and will hereinafter be referred to as first-to third-phase position detection signals.)

On applying power to the motor, electric power is supplied from the positive and negative terminals 2a and 2b of the direct current power supply to the current supply control circuit (FIG. 4). A voltage lower than that applied to the positive terminal of the operational amplifier 40a is applied to the negative terminal of the same amplifier, whereby a high-level output is supplied from the operational amplifier 40a to the AND circuits 14a to 14c and thus open them. At the start of the motor, any one of the detection coils 10a to 10c of the position detection device is opposed to one of the salient poles 1a to 1h of the rotor 1 of the motor, as mentioned above.

In this case, if a high-level second-phase position detection signal 29a, for example, is supplied from the position detection device to the input terminal 4b of the current supply control circuit (FIG. 4), this high-level signal 29a is supplied to the base of the transistor 20d, while a high-level output from the AND circuit 14b, which is then in an open state, is converted into a low-level output by the inverter and then applied to the base of the transistor 20c. Accordingly, the transistors 20c and 20d are rendered conductive, permitting an electric current to pass the exciting coils 17b and 17e (the second-phase exciting coil pair L). As a result, the magnetic poles 16b and 16f of the armature 16 are magnetized and the salient poles 1b and 1f are magnetically attracted, so that the rotor 1 is rotated in a direction indicated by arrow A-1 in FIG. 1. Thereafter, when the rotor 1 is rotated over 90 degrees, the second-phase position detection signal 29 becomes low-level and simultaneously a high-level third-phase position detection signal 30a is supplied to the input terminal 4c of the current supply control circuit. Namely, the current supply to the exciting coil pair L is interrupted while an electric current is supplied to the exciting coil pair M. When the rotor 1 is further rotated by 120 degrees, the current supply to the exciting coil pair M is interrupted and a current is supplied to the exciting coil pair K.

Figure 2:
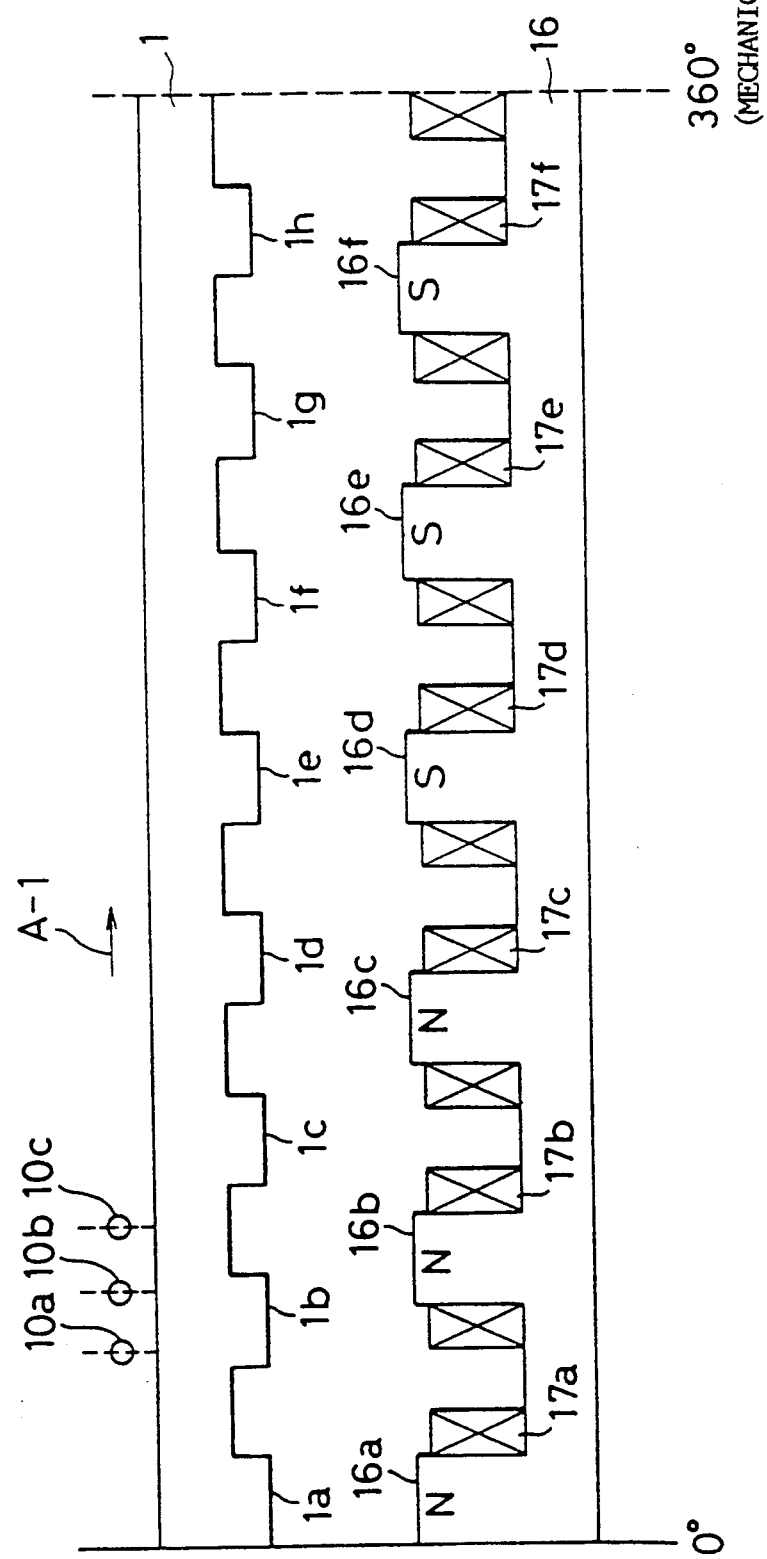
FIG. 2 is a development illustrating a rotor and an armature shown in FIG. 1, along with position detecting elements.

In this manner, the current supply mode cyclically changes in order of the exciting coil pair K, the exciting coil pair L and the exciting coil pair M, with every rotation over 120 degrees, whereby the exciting coil pairs K to M are sequentially and continuously supplied with an electric current and the motor generates an output torque. At this time, the axially symmetrical magnetic poles are magnetized to act as N and S poles, as shown in FIG. 2. Since the excited two magnetic poles are always of opposite polarities, the leakage flux passes the unexcited magnetic poles in opposite directions, thus eliminating the generation of counter-torque.

While an electric current is supplied to the aforesaid exciting coils, for instance, while a high-level first-phase position detection signal 28a is generated and an electric current is supplied to the first-phase exciting coil pair K, if the exciting current flowing through the exciting coil pair K exceeds a preset value corresponding to the reference voltage, which is applied to the positive input terminal of the operational amplifier 40a through the reference voltage input terminal 40 of the current supply control circuit shown in FIG. 4 and which is variably adjustable, the output of this operational amplifier becomes low-level, closing the AND circuit 14a and turning off the transistor 20a. In this case, the magnetic energy stored in the exciting coil pair K is discharged in the form of electric current through the diode 21a, the transistor 20b and the resistor 22, and after this, when the current is reduced to a predetermined value determined by the hysteresis characteristic of the operational amplifier 40a, the output of this operational amplifier becomes high-level and the transistor 20a is turned on again, permitting the passage of the exciting current. In this way, the operational amplifier 40a cooperates with the AND circuit 14a to turn on and off the transistor 20a in accordance with the relationship between the values of the exciting current and the above preset value, thereby controlling the exciting current and thus the output torque of the motor. The above is the case with the other phases, and therefore, the operational amplifier 40a functions, in cooperation with the AND circuits 14a to 14c, as a chopper circuit.

Features of the operation of the motor according to this embodiment will be now described with reference to FIG. 5.

In a conventional motor, when, for example, an electric current is supplied to the second-phase exciting coil pair L during an interval equivalent to the width of 180 degrees of the second-phase position detection signal 20a, as indicated by arrow 36, the current supply is delayed at the rising portion thereof, as indicated by the former half of the dashed curve 34, due to a large inductance of the exciting coil pair L. Further, since large magnetic energy is discharged, the falling portion of the current supply is prolonged, as indicated by the latter half of the curve 34. Here the arrow 37 denotes an interval of 180 degrees in which positive torque is generated. Accordingly, the torque is reduced (namely, reduced-torque occurs, as hereinafter called) in the former half of the curve 34 and a large counter-torque is produced in the latter half of same, and therefore, the conventional motor is low in efficiency and in rotational speed.

The motor according to the embodiment eliminates these disadvantages, as stated below. When, for instance, an electric current is supplied to the second-phase exciting coil pair 1 in response to generation of the second-phase position detection signal 29a, the exciting current quickly rises, as indicated by a current supply curve (dashed curve) 34b in FIG. 5, due to a high voltage applied from the direct current power supply terminal 2a, whereby the occurrence of reduced-torque is eliminated. This holds for the exciting coils of the other phases. In the case of rotating the motor at a high speed, since the width of the position detection signal is correspondingly small, a direct current power supply with a higher terminal voltage is used to thereby shorten the width of the rising portion of the current supply curve.

When the position detection signals of the individual phases fall, for instance, the first-phase signal 28a falls, both the transistors 20a and 20b are turned off, and an electric current flows through a path from the diode 21b to the power supply terminals 2a and 2b, to the resistor 22, and to the diode 21a, namely, the energy flows back to the power supply, due to the magnetic energy stored in the exciting coil pair K. As a result, the exciting current is quickly decreased (see the falling portion of the curve 34 relating to the second-phase signal 29a). The magnetic energy thus returned is, in general, stored in a large-capacitance rectifying capacitor incorporated in the direct current power supply. Here, the higher the power supply voltage, the shorter the width (indicated by arrow 37a) of the falling portion of the current supply curve 34, and when the width of the falling portion is not greater than 30 degrees, no substantial counter-torque is caused. This is the case with the other current supply curves 34b and 34c. In the case of rotating the motor at a high speed, a direct current power supply with a higher terminal voltage is used, to shorten the width of the falling portion of the current supply curve, which becomes shorter with decrease in the width of the position detection signal.

Here it should be noted that according to this embodiment, the maximum allowable rotation speed of the motor can be determined by the value of the direct current power supply voltage, and that the output torque of the motor can be controlled in accordance with the value of the reference voltage applied to the reference voltage input terminal 40. Namely, the maximum rotational speed and the output torque of the motor can be controlled independently.

Further, the motor of this embodiment can provide an even output torque characteristic. Specifically, the widths of the salient poles 1a to 1h of the rotor 1 along the axis of the rotary shaft differ from those of the magnetic poles 16a to 16f of the armature 16, as mentioned above, and accordingly, a leakage flux is produced between the opposed faces of the salient poles and the magnetic poles, which contributes to leveling the output torque of the motor after time B, as indicated by dashed curves 41a to 41c. However, as the rotational speed of the motor is increased, the output characteristic varies from the curve 41a toward the curve 41c, gradually narrowing the width of the flat portion.

Figure 5:
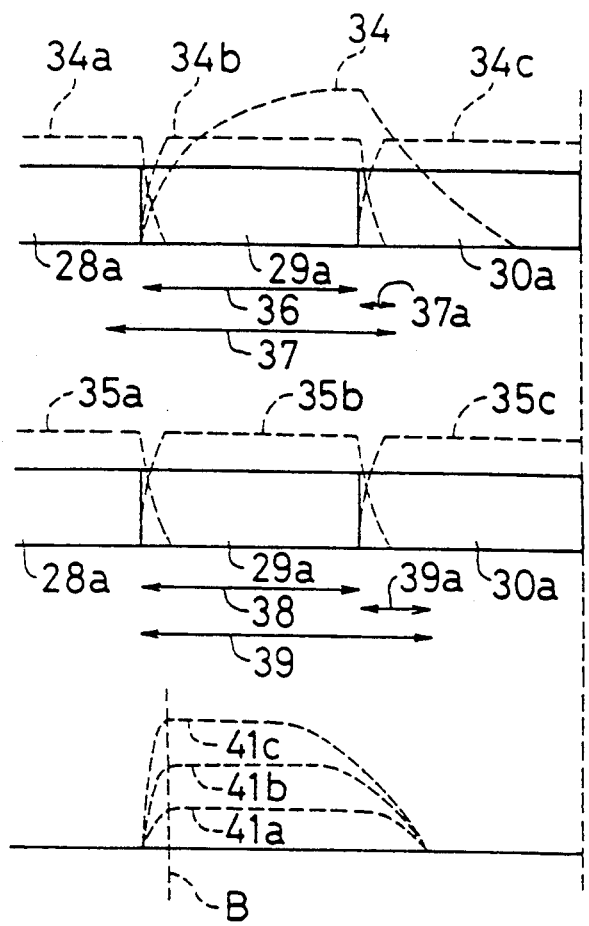
FIG. 5 is a graph showing an exciting current curve and an output torque curve of the motor in FIG. 1.

To make the output torque characteristic more even, preferably the positions of the detection coils 10a to 10c are adjusted such that the time for starting the current supply is advanced, namely, the current supply is started near the rise of the torque curve, whereby even and large output torque is obtained, as indicated by exciting current curves (dashed curves) 35a to 35c in FIG. 5. In the figure, arrows 38 and 39 respectively denote the width (120 degrees) of a high-level first-phase position detection signal 29a and the width (180 degrees) in which positive torque is obtained. When the width of the falling portion of the exciting current curve 35b is smaller than the width of the interval indicated by arrow 39a, no counter-torque is generated. The width of the interval 39a is twice as long as that of the interval 37a (this is the case with the curves 35a and 35c), and accordingly, the flat portion of the output torque is prolonged, ripple of the output torque is reduced, and the motor can be rotated at a high speed. By altering the shape of the salient poles of the rotor 1 facing the magnetic poles of the armature 16, it is possible to further prolong the flat portion of the torque curve.

Next, referring again to FIG. 1, the effect of preventing a rotational vibration, achieved by the motor of this embodiment, will be described. As mentioned above, the exciting coils associated with each pair of magnetic poles arranged symmetrically about the rotary shaft 5 have different numbers of winding to prevent vibration. When exciting coils with the same number of winding are fitted to a pair of magnetic poles, as in the ordinary case, the magnetic forces exerted, e.g., by the magnetic poles 16a and 16d to radially attract the salient poles 1a and 1e are ideally canceled out, and the attractive force acting in the circumferential direction serves to produce an output torque. However, since the radial attractive forces are extremely strong, if there is even a slight dimensional difference in the gaps between the individual magnetic poles and the salient poles opposed thereto or even a slight machining error exists in the bearings of the rotary shaft 5, the rotor 1 receives a force acting in the direction indicated by arrow 3a or in the opposite direction and accordingly is vibrated during rotation of the rotor 1. The salient poles 1a to 1h of the rotor 1 are opposed to the magnetic poles 16a to 16f of the armature 16 with a gap as small as about 0.15 mm, and therefore, such vibration should desirably be eliminated.

In view of this, among the exciting coil pairs K to M arranged symmetrically about the rotary shaft 5 and connected in series, the number of winding of one exciting coil in each pair, i.e., the exciting coils 17a, 17b and 17c, is increased by a predetermined number than that of the other exciting coil in the same pair, i.e., the exciting coils 17b, 17e and 17f, and an electric current is sequentially passed through the exciting coil pairs K to M, whereby the rotor 1 receives only those forces acting in directions indicated by arrows 3a, 3b and 3c during the rotation thereof. Consequently, although the direction in which a force acts on the rotor 1 varies in order of 3a, 3b and 3c, the rotor 1 eventually receives only those forces acting in similar directions toward one side (upper right side) thereof with respect to a broken line 3. Therefore, the rotor 1 is rotated with the rotary shaft 5 pressed against the bearings, thus producing no vibration. In this case, the force applied by a load, which is driven by the rotary shaft 5, is made to act on the rotor in the direction of arrow 3b.

A three-phase half-wave reluctance motor according to a second embodiment of this invention will be now described.

Figure 7:
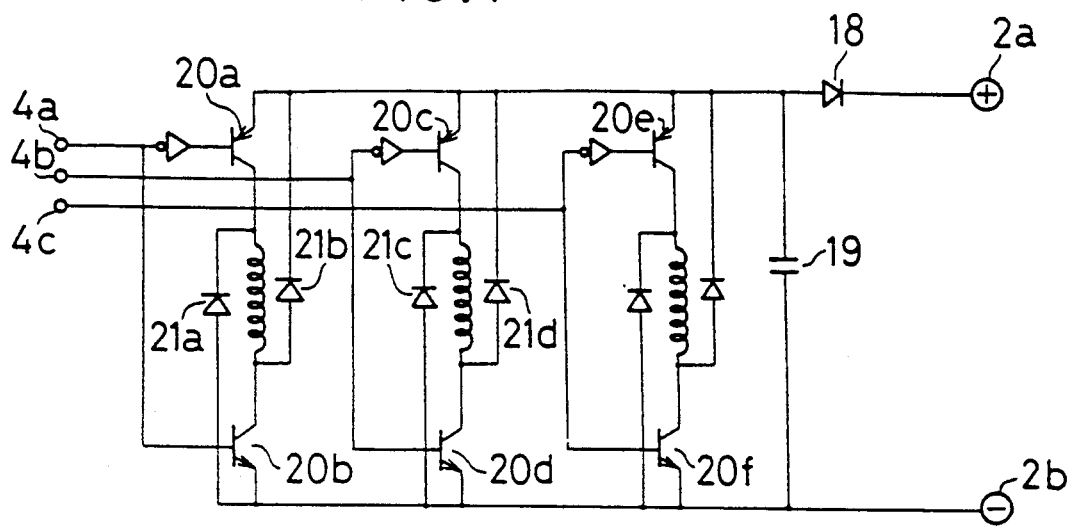
FIG. 7 is a schematic circuit diagram showing a current supply control circuit for a motor according to a second embodiment of this invention.

The motor of this embodiment can be operated with a direct current power supply having a lower terminal voltage, e.g., a battery, compared to the motor of the first embodiment, and therefore can be used as a drive source for an electric vehicle which uses a battery as a power supply, unlike the first embodiment. To this end, the reluctance motor of the second embodiment has a current supply control circuit shown in FIG. 7, instead of the circuit of FIG. 4, and this current supply control circuit comprises, in place of the operational amplifier 40a and the AND circuits 14a to 14c, a diode 18 and a capacitor 19 for the prevention of reverse current.

As in the first embodiment, when a high-level position detection signal, for example, the signal 28a, 29a or 30a, is input to the input terminals 4a–4c of the current supply control circuit from the position detection device, an electric current is supplied sequentially to the exciting coil pairs K to M and the motor is rotated. In this case, the exciting current takes a value equal to the quotient obtained by dividing the difference between the voltage across the direct current power supply terminals 2a and 2b and a counter electromotive force proportional to the output torque curves 41a to 41c shown in FIG. 5, by the resistance value of the exciting coils. Accordingly, the exciting current maintains a substantially constant value in an intermediate portion of the current supply period in which the counter electromotive force is even. In the latter half of the current supply period in which the counter electromotive force is decreased, on the other hand, the exciting current increases and thus the output torque is increased, whereby a torque reduction in the latter half of the output torque curve is compensated.

When the high-level first position detection signal 28a, for example, falls and thus the current supply to the first-phase exciting coil pair K is interrupted, an electric current flows through a path from the exciting coil pair K, to the diode 21b, to the capacitor 19, and to the diode 21a, due to the magnetic energy stored in the exciting coil pair K (FIG. 7), and the capacitor 19 is charged to a high voltage. As a result, the stored magnetic energy is quickly extinguished, and, as indicated by the curve 34a (FIG. 5), the exciting current is decreased. Since, by this time, the second position detection signal 29a is input to the input terminal of the current supply control circuit and the transistors 20c and 20d are rendered conductive, the direct current power supply voltage and the voltage of the charged capacitor 19 are both applied to the second-phase exciting coil pair L. Consequently, the exciting current flowing through the exciting coil pair L quickly rises, as indicated by the curve 35b in FIG. 5, and thereafter is maintained at a substantially constant value, as described above. This is the case with the third-phase exciting coil pair M.

If the capacitance of the capacitor 19 is small, the widths of the rising and falling portions of the exciting current are correspondingly small, whereby the occurrence of reduced-torque and counter-torque during high-speed operation of the motor can be prevented, namely, the motor can be operated at a high speed and with high efficiency. In the case in which, of the transistor pairs associated with the exciting coils of the respective phases, one transistor pair is turned on simultaneously with the turning-off of another transistor pair, the capacitor 19 may be omitted.

Unlike the first embodiment in which the magnetic energy stored in the exciting coils is returned to the direct current power supply, according to the motor of this embodiment, the backflow of the stored magnetic energy to the smoothing capacitor incorporated in the direct current power supply is prevented by the reverse current-preventing diode 18, and the stored magnetic energy is supplied through the capacitor 19 to the next exciting coil to which an electric current is being supplied, so that the magnetic energy is quickly discharged from one of adjacent exciting coils and is quickly stored in the other. Therefore, the voltage of the direct current power supply may be low.

In the case of a 300 W-output motor according to this embodiment including a capacitor 19 having a capacitance of 0.1 μF or less, the time required for the extinction and storage of the aforesaid magnetic energy is shorter than 20 μsec, permitting the motor to be operated at a speed of 100,000 revolutions per minute. In the case of operating the motor at a normal rotational speed, however, the capacitance of the capacitor is preferably set to a value large enough to reliably prevent the occurrence of counter-torque, to thereby reduce the eddy-current loss, which is a factor of the iron loss, and to improve the efficiency.

A three-phase reluctance motor according to a third embodiment of this invention will be described with reference to FIGS. 8 to 11.

The motor of this embodiment comprises a main body (FIG. 8) basically identical in arrangement with that of the motor shown in FIG. 1, and detection coils 110a to 110c (FIG. 9) corresponding to the detection coils 10a to 10c in FIG. 2. The main body of the motor comprises a rotor 101 having seven salient poles 101a to 101g, an armature 116 having six magnetic poles 116a to 116f to which exciting coils 117a to 117f are respectively fitted, and a rotary shaft 105. The motor also comprises a position detection device (FIG. 10) corresponding to the position detection device shown in FIG. 3, which device includes a bridge circuit in association with the first detection coil 110a, composed of this detection coil and resistors 115a to 115c. To the bridge circuit are connected a low-pass filter composed of diodes 111a and 111b and capacitors 112a and 112b, an operational amplifier 113, and a logic circuit 118 comprising a circuit usually used for a control circuit of a three-phase Y-connection semiconductor motor and including six output terminals 118a to 118f. More specifically, the diode 111a in the low-pass filter has an anode connected to a connection node between the coil 110a and the resistor 115a, and has a cathode connected to one end of the capacitor 112a, the other end of which is grounded, and to the positive input terminal of the operational amplifier 113. The other diode 111b has an anode connected to a connection node between the resistors 115b and 115c, and a cathode connected to one end of the capacitor 112b, the other end of which is grounded, and the negative input terminal of the operational amplifier 113. The output terminal of the operational amplifier 113 is connected to an input side of the logic circuit 118 and an input terminal of an inverter 113a provided between the operational amplifier 113 and the logic circuit 118.

Figure 10:
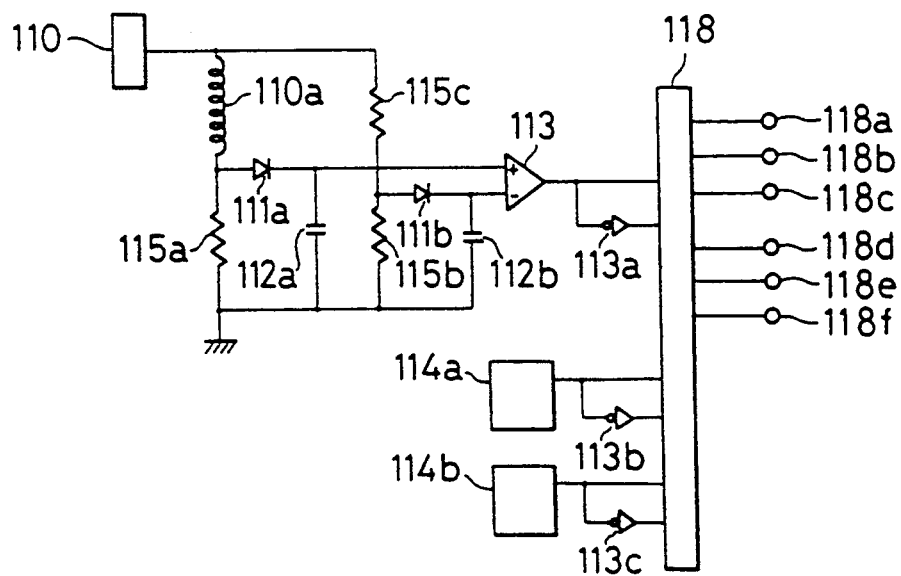
FIG. 10 is a circuit diagram showing a position detection device used with the motor of FIG. 8.

In FIG. 10, numerals 114a and 114b denote circuits associated with the coils 110b and 110c, respectively, which are each composed of elements corresponding to the bridge circuit, the low-pass filter, and the operational amplifier associated with the coil 110a, and are connected to a common oscillator 110 corresponding to the element 7 in FIG. 3. Numerals 113b and 113c denote inverters individually corresponding to the inverter 113a.

The motor further comprises a current supply control circuit (FIG. 11) corresponding to the circuit of FIG. 4. Input terminals 155a to 155f of the current supply control circuit are respectively connected to output terminals 118a to 118f of the position detection device. The input terminals 155a to 155c are connected to the bases of transistors 120b, 120d and 120f, respectively, and also connected through inverters to the bases of three transistors (switching elements) 120a, 120c and 120e, respectively, the emitters of which are connected to a positive terminal 102a of the direct current power supply through a diode 149a and a transistor 141a. The collectors of the switching transistors 120a, 120c and 120e are connected to respective ends of the exciting coils 117a, 117c and 117e, which have other ends connected to a negative terminal 102b of the direct current power supply through corresponding ones of the switching transistors 120b, 120d and 120f and an exciting current detection resistor 122a. A diode 121a is connected to a series connection of the exciting coil 117a and the transistor 120b, and a diode 121b is connected to a series connection of the same exciting coil and the transistor 120a. Similarly, diodes 121c and 121d and diodes 121e and 121f are respectively connected to the exciting coils 117c and 117e. A connection node between the resistor 122a and the transistors 120b, 120d and 120f is connected to the positive input terminal of an operational amplifier 140a, whose negative input terminal is connected to a reference voltage input terminal 140 to which a reference voltage is applied for a variable control of the exciting current (motor output torque), and the output terminal of the operational amplifier 140a is connected to the base of a transistor 141a which cooperates with the amplifier 141a to function as a chopper circuit mentioned later.

Figure 11:
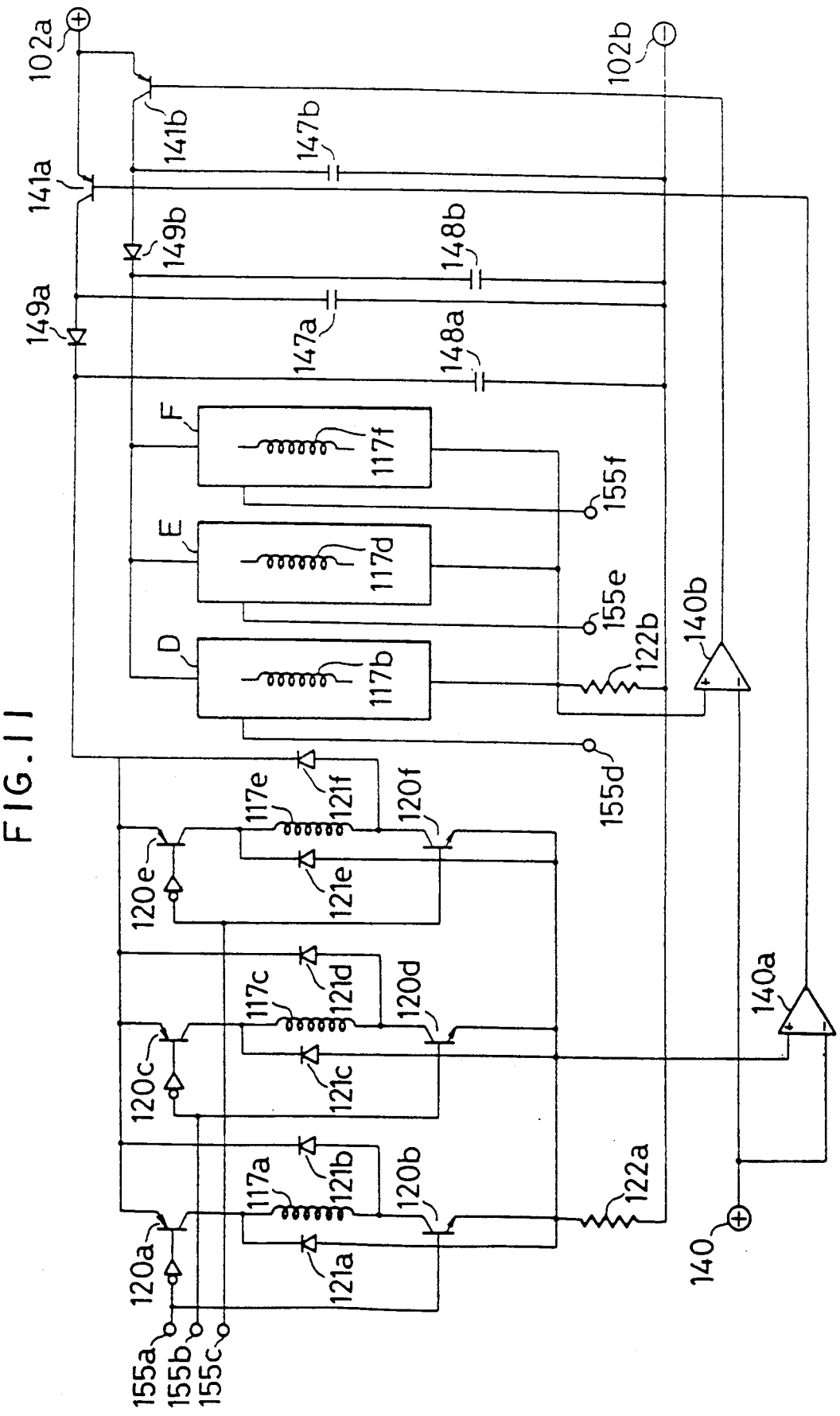
FIG. 11 is a circuit diagram showing a current supply control circuit used with the device of FIG. 10.

The exciting coils 117b, 117d and 117f similarly include various circuit elements equivalent to those described above with reference to the exciting coils 117a, 117c and 117e, as indicated by symbols D to F in FIG. 11. Reference numerals 122b, 140b, 141b, 148a, 148b and 149b respectively correspond to the aforementioned elements 122a, 140a, 141a, 147a, 147b and 149a.

The operation of the reluctance motor according to the third embodiment, shown in FIGS. 8 to 11, will be now described with reference to FIGS. 12 and 13.

At the start of the motor, any one of the detection coils 110a to 110c is opposed to one of the salient poles 101a to 101g of the rotor 101. When the detection coil 110a, for instance, is opposed to a salient pole, the output 125 of the operational amplifier 113 becomes high-level (indicated at 125a and 125b in FIG. 12), as in the case of the first embodiment. Namely, as the rotor 101 rotates, a rectangular-wave signal 125 is output from the operational amplifier 113. In FIG. 12, numeral 126 denotes the output of the inverter 113a. Likewise, when the detection coil 110b or 110c is opposed to one of the salient poles, the output 127 or 129 of an unillustrated operational amplifier, included in the blocks 114a and 114b, respectively, becomes high-level (indicated at 127a, 127b, 129a and 129b in FIG. 12), and a rectangular-wave signal 127 or 129 is output from the operational amplifier as the rotor 101 rotates. Rectangular-wave signals 128 and 130 are output from the inverters 113b and 113c, respectively. The rectangular wave signals 125, 127 and 129 are shifted in phase from each other by 120 degrees. This is the case with the signals 126, 128 and 130.

Figure 12:
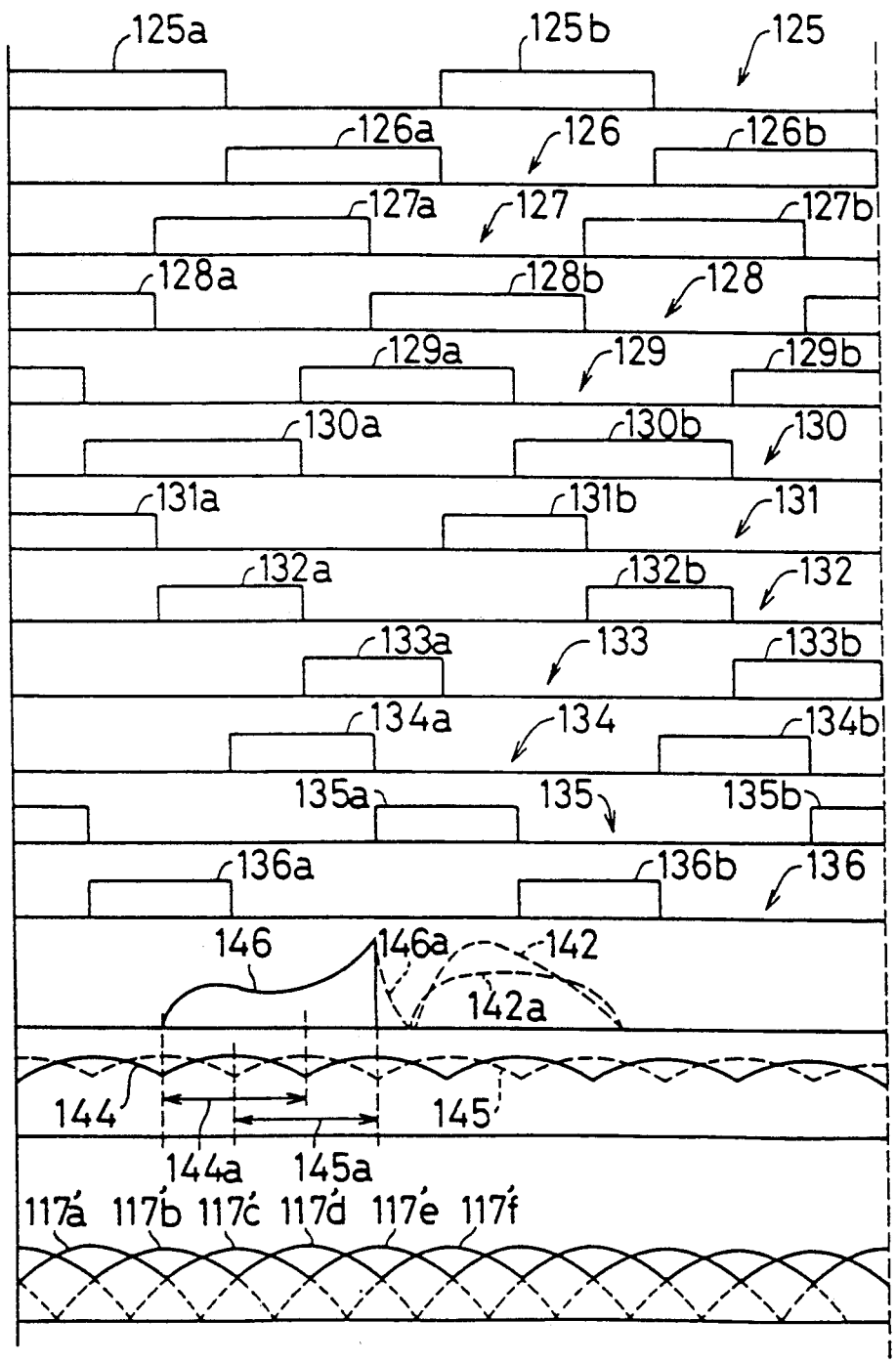
FIG. 12 is a timing chart showing various signals of the position detection device of FIG. 10.

From the output terminals 118a to 118f of the logic circuit 118, to which the above rectangular-wave signals 125 to 130 are input, rectangular-wave position detection signals 131 to 136 representing the rotational position of the rotor are respectively output (FIG. 12).

The signals 131 and 134, the signals 132 and 135, and the signals 133 and 136 respectively have a phase difference of 180 degrees, and the signals 131 to 133 and the signals 134 to 136 respectively have a phase difference of 120 degrees.

When the power of the motor is turned on, an electric current is supplied to the current supply control circuit (FIG. 11) from the positive and negative terminals 102a and 102b of the direct current power supply. A voltage higher that applied to the positive input terminals of the operational amplifiers 140a and 140b is applied to the negative input terminals of the same amplifiers, whereby low-level outputs are supplied from these amplifiers to the transistors 141a and 141b, respectively, rendering the transistors conductive. Meanwhile, any one of the detection coils 110a to 110c is opposed to one of the salient poles 101a to 101f of the rotor.

On application of the power, if, for example, high-level position detection signals 134a and 132a are supplied from the position detection device to the input terminals 155b and 155a of the current supply control circuit, the transistors 120c and 120d and the two transistors in the block D are rendered conductive, whereby an electric current is supplied to the exciting coils 117b and 117c. As a result, the magnetic poles 116b and 116c of the armature 116 are magnetized and magnetically attract the salient poles 101b and 101c, and accordingly, the rotor 101 is rotated in a direction indicated by arrow A-3 in FIG. 8. When the rotor is thereafter rotated over 30 degrees, the current supply to the exciting coil 117b is interrupted while an electric current is supplied to the exciting coil 117d, whereby the salient pole 101d is attracted and thus torque is generated.

In this manner, the current supply mode varies with every 60-degree rotation of the rotor 101, in other words, the excited magnetic poles of the armature cyclically change in order of the magnetic poles 116b (N pole) and 116c (S pole), the magnetic poles 116c (S pole) and 116d (N pole), the magnetic poles 116d (N pole) and 116e (S pole), the magnetic poles 116e (S pole) and 116f (N pole), and the magnetic poles 116f (N pole) and 116a (S pole). As a result, the rotor 101 is driven in the direction of arrow A-3. In this case, the excited two magnetic poles are always of opposite polarities, and therefore, the leakage flux passes the unexcited magnetic poles in opposite directions, thereby preventing the occurrence of counter-torque.

When the aforesaid position detection signals are generated, for example, a high-level position detection signals 131a is generated, the current supply to the exciting coil 117a is started. Similar to the case of the first embodiment, the delay at the rising portion (indicated at 137a) of the exciting current passing the exciting coil 117a, caused due to the inductance of the coil, is reduced by use of the high voltages at the direct current power supply terminals 102a and 102b. Thereafter, when the voltage across the resistor 122a, representing the exciting current, is applied to the negative input terminal of the operational amplifier 140a through the reference voltage input terminal 140 of the current supply control circuit and becomes higher than a preset value corresponding to the variably adjustable reference voltage, the output of the operational amplifier becomes high-level, whereby the transistor 141a is turned off and the current supply to the exciting coil 117a from the direct current power supply is interrupted. At this time, an electric current is supplied to the exciting coil 117a from the capacitor 147a. When, thereafter, the voltage across the resistor 122a is decreased to a predetermined value determined by the hysteresis characteristic of the operational amplifier 140a, the output of the operational amplifier becomes low-level again, turning on the transistor 141a and restarting the current supply to the exciting coil 117a. In this manner, the operational amplifier 140a cooperates with the transistor 141a to control the exciting current, i.e., the output torque of the motor, in accordance with the relation between the exciting current and the aforesaid preset value. This holds for the other exciting coils, and therefore, the operational amplifiers 140a and 140b cooperate with the transistors 141a and 141b, respectively, to function as a chopper circuit. Accordingly, as in the cases of the above embodiments, the maximum operating speed and the output torque of the motor can be controlled independently.

It should here be noted that the chopping frequency determined mainly by the capacitances of the capacitors 147a and 147b is invariable, unlike a conventional unstable chopper circuit whose chopping frequency is varied with changes in the impedance of the exciting coils caused by changes in the amount of the magnetic flux passing the magnetic poles. The operation of the chopper circuit has no connection with the direct current power supply voltage, and accordingly, is in no way affected by fluctuation of the same. It is therefore unnecessary to use a large-capacitance capacitor for the purpose of rectification, in a power supply using a rectifying capacitor for obtaining a direct current from an alternating current, particularly in a three-phase power supply, thereby simplifying the construction of the power supply. Moreover, when setting the peak value of the alternating current power supply voltage to a value twice or more the value corresponding to the preset value of exciting current relating to the aforesaid reference voltage, the width of the alternating current power supply voltage contributing to the current supply of the exciting current is about two-thirds the width of half-period of the alternating current power supply voltage. Accordingly, unlike the conventional case of using a converter for achieving a pulsed current supply close to the peak voltage, it is possible to broaden the width of current supply with respect to the alternating current power supply and to eliminate the occurrence of mechanical and electrical noises.

Figure 13:
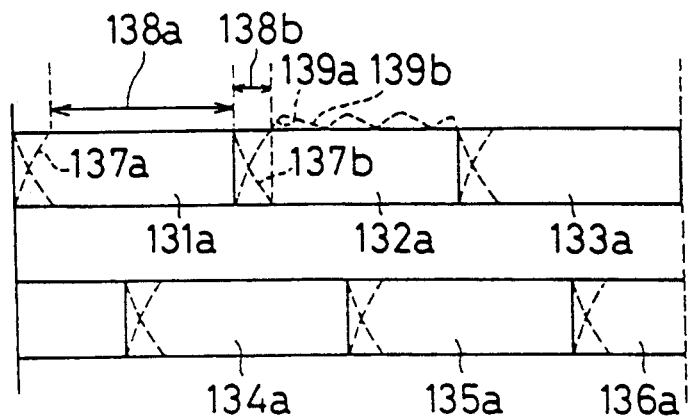
FIG. 13 is a graph similar to FIG. 5 but with regard to the motor of FIG. 8.

Referring to FIG. 13, when the high-level position detection signal 131a decays at a time indicated by the thick vertical line, the exciting current relating thereto correspondingly fails. Simultaneously, the high-level position detection signal 132a is generated and the current supply to the exciting coils 117c is started, whereby the exciting current flowing through this coil rises as indicated by the dashed line 139a. At this time, as in the case of the second embodiment, the magnetic energy stored in the exciting coil 117a is discharged in the form of an electric current through a path from the diode 122lb, to the capacitor 148a, to the resistor 122a, to the diode 121a, and to the exciting coil 117a, and accordingly, the exciting current flowing through the coil 117a is quickly decreased, as indicated by the dashed line 137b, and the capacitor 148a is charged. The diode 149a serves to prevent the current flow to the direct current power supply caused due to the stored magnetic energy. The voltage of the charged capacitor is applied to the exciting coil 117c, thereby quickly rising the exciting current supplied to this coil. As a result, the same effect as obtained with an increased direct current power supply voltage is achieved, and both the width of the falling portion of the exciting current passing the coil 117a and the width of the rising portion of the exciting current passing the coil 117c are no greater than an electrical angle of 30 degrees, at which counter-torque is generated. The exciting current for the coil 117a varies as indicated at 139b, due to the chopper control achieved by the operational amplifier 140a and the transistor 141a. Thereafter, in response to the generation and extinction of the high-level position detection signal 133a, the current supply to the exciting coil 117e is controlled in the same manner as described above.

Similar current supply control is effected also at the generation and extinction of the position detection signals 134 to 136. During this current supply control, the chopper control is affected by the operational amplifier 140b and the transistor 141b, while the capacitor 147b is charged and discharged and an exciting current flows through the exciting coils 117b, 117d and 117f.

In FIG. 12, curves 117a' to 117f' denote torques generated by the current supply to the exciting coils 117a to 117f, respectively, with lapse of time, curve 144 denotes a torque generated by the current supply to the first exciting coil group including the exciting coils 117a, 117c and 117e, and curve 145 denotes a torque generated by the current supply to the second exciting coil group including the exciting coils 117b, 117d and 117f. Numerals 144a and 145a denote torque generation periods relating to the exciting currents flowing through the coils 117c and 117d, respectively. The output torque produced by the motor is equal to the composite of the torques 144 and 145 and, like the output torque of a three-phase Y-connection semiconductor motor, has a small fluctuation with lapse of time. Curve 146 denotes an exciting current characteristic of a conventional reluctance motor, wherein the exciting current has a small value at the initial stage of current supply due to the inductance of the exciting coil, and has a still smaller value at the intermediate stage due to the counter electromotive force. The exciting current at the last stage of current supply, which is suddenly increased with a reduction in the counter electromotive force, does not contribute to the generation of output torque of the motor, rather it causes a Joule loss, and as indicated by a dashed line 146a, a counter-torque is produced due to the discharged magnetic energy. In the conventional reluctance motor, moreover, an extremely large torque 142 is generated when a salient pole of the rotor approaches a position facing a magnetic pole of the armature, while the torque is reduced when the salient pole moves away from the magnetic pole. According to this embodiment, the width of the salient poles along the axis of the rotary shaft differs from that of the magnetic poles, like the first embodiment, whereby an even output torque characteristic 142 can be obtained.

It is noted that the rotor 201 is rotated by the magnetic attractive forces produced by a pair of adjacent magnetic poles, and accordingly, the vector of the force acting in the radius direction between the magnetic pole and the salient pole rotates synchronously with the rotation of the rotor, whereby during rotation of the rotor, the rotary shaft 205 is always pushed against the bearings and thus is not vibrated.

A two-phase reluctance motor according to a fourth embodiment of this invention will be described with reference to FIGS. 14 to 16.

Figure 8:
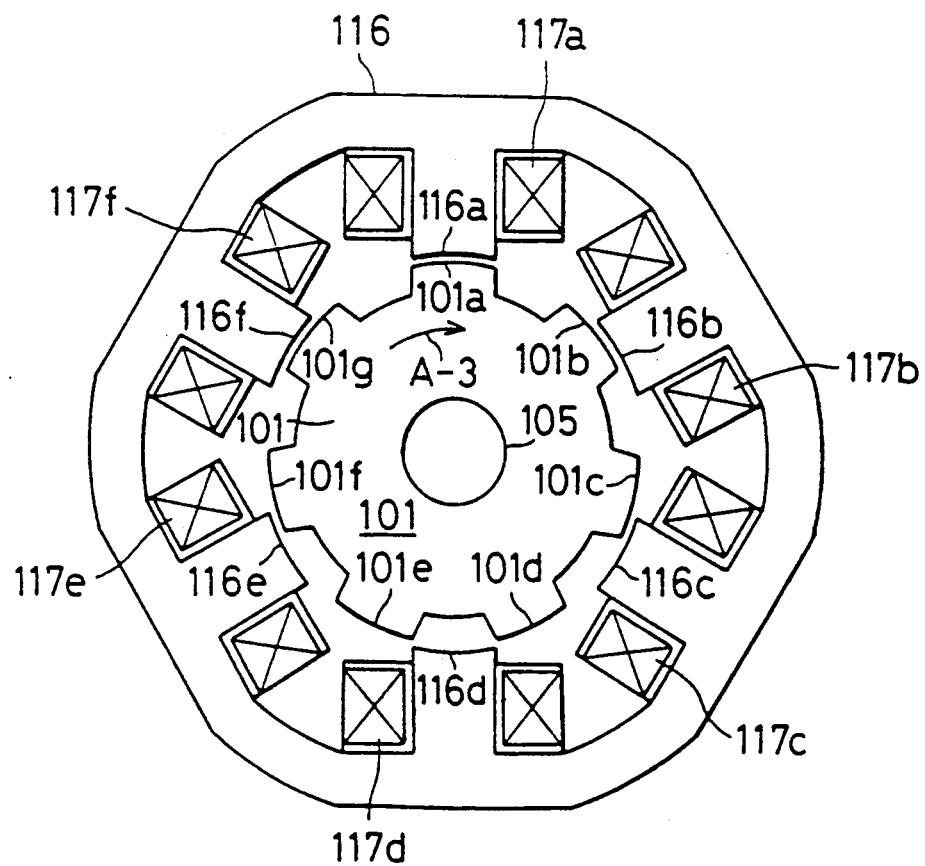
FIG. 8 is a sectional view of a three-phase reluctance motor according to a third embodiment of this invention.
Figure 14:
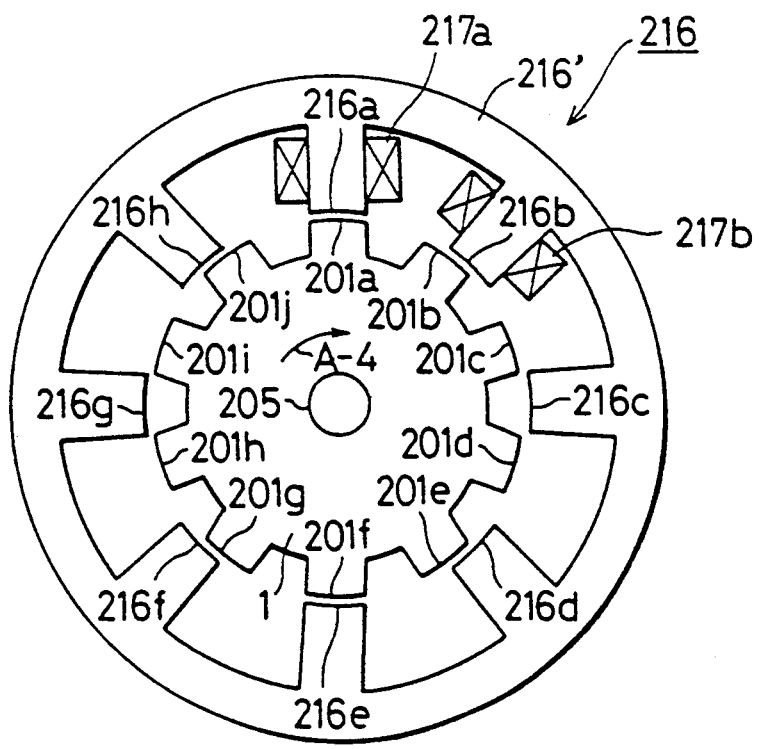
FIG. 14 is a schematic view of a two-phase reluctance motor according to a fourth embodiment of this invention.

The motor has a main body basically similar in arrangement to those shown in FIGS. 1 and 8, and the main body comprises, as shown in FIG. 14, a rotor 201 fitted on a rotary shaft 205 and having ten salient poles 201a to 201j, and an armature 216 having eight magnetic poles 216a to 216h, to which exciting coils (only two exciting coils are illustrated at 217a and 217b) are respectively fitted, and an annular magnetic core 216'. The exciting coils are formed by thick electric wire to reduce the copper loss and thus improve the efficiency of the motor, and to permit a required magnetic flux to be produced in a reluctance motor having no field magnet, a space large enough to contain large exciting coils is provided. The exciting coils 217a and 217e are connected in series or in parallel, and this pair is hereinafter called the first exciting coil pair K' (FIG. 16). The exciting coils 217b and 217f, the exciting coils 217c and 217g, and the exciting coils 217d and 217h are respectively connected to each other, and these pairs will hereinafter be called the second to fourth exciting coil pairs L', M' and S' (FIG. 16), respectively.

Figure 9:
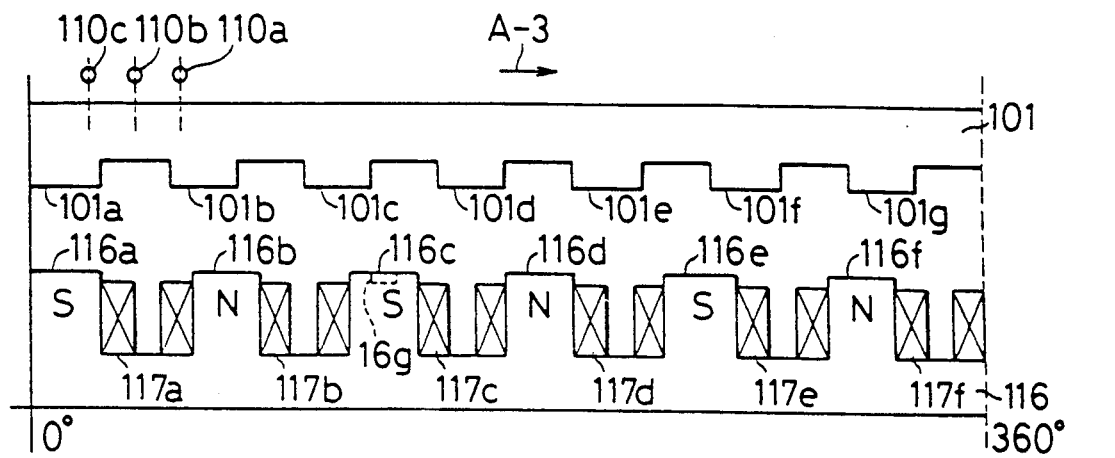
FIG. 9 is a development illustrating a rotor and an armature shown in FIG. 8.

The motor includes a position detection device having a basically identical arrangement to that shown in FIG. 10. This device, however, does not have elements corresponding to the logic circuit 118, the block circuit 114b and the inverter 113c in FIG. 10, and has detection coils 208a and 208b shown in FIG. 15, instead of the detection coils 110a and 110b. These detection coils, which are identical to those shown in FIG. 9, are spaced from each other by an electrical angle of 90 degrees and arranged such that they can be opposed to the side surfaces of the salient poles 201a to 201j. The detection coils 208a and 208b are adapted to generate a position detection signal when a salient pole is at about 30 degrees before a magnetic pole, for the purpose mentioned later.

Figure 16:
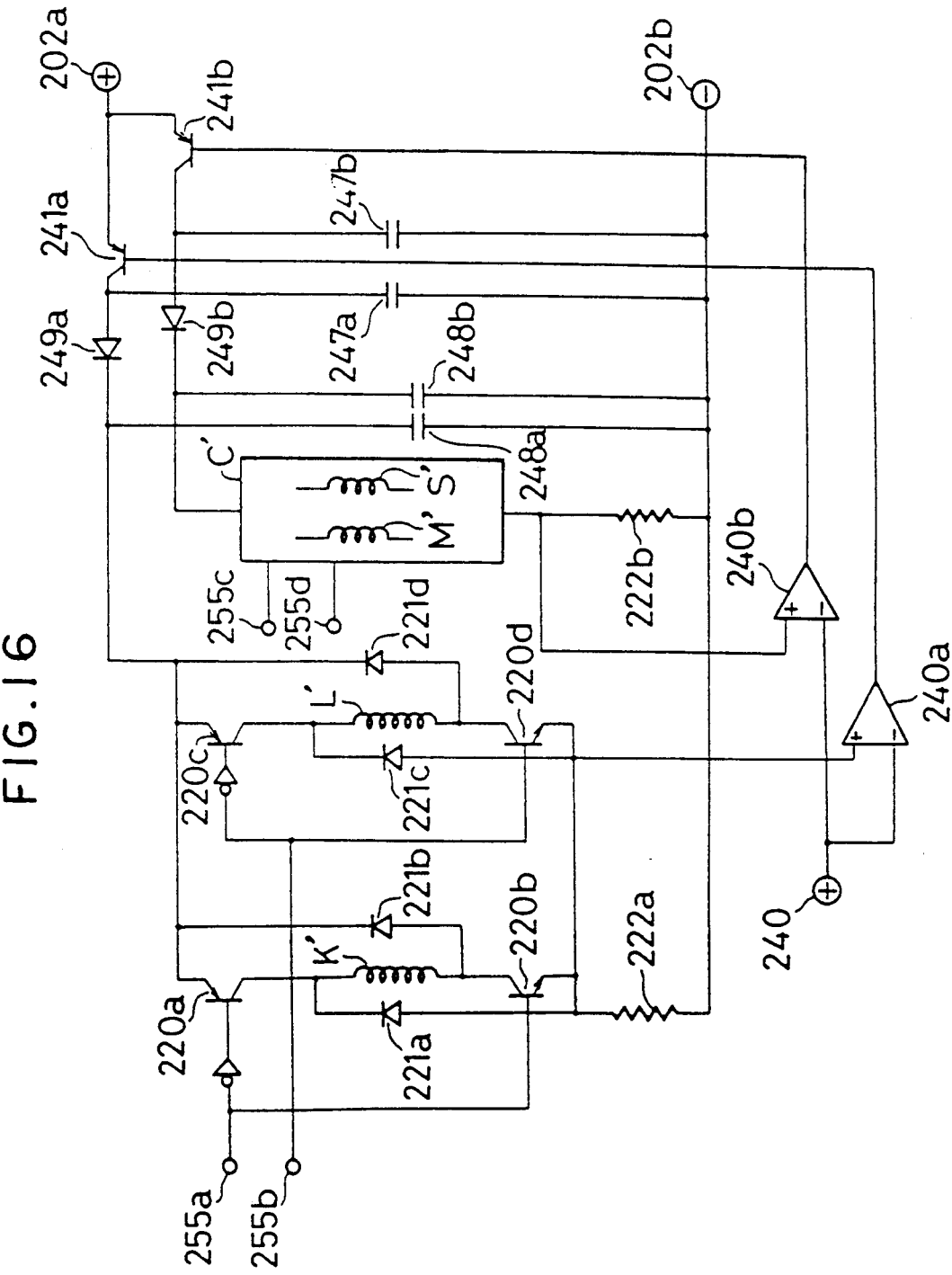
FIG. 16 is a circuit diagram showing a current supply control circuit used with the motor of FIG. 14.

The motor further comprises a current supply control circuit shown in FIG. 16. In this circuit, unlike the circuit of FIG. 11 wherein the current supply to the exciting coils is controlled in accordance with six different position detection signals, the current supply to the four pairs of exciting coils is controlled in accordance with four different position detection signals, but the arrangement of the circuit is fundamentally identical to that shown in FIG. 11, and accordingly, a detailed description is omitted. In FIG. 16, the elements are numbered in a manner similar to that of FIG. 11, for instance, the element 202a corresponds to the element 102a in FIG. 11. A block indicated by symbol C' includes the two exciting coil pairs M' and S' and their peripheral elements.

Figure 15:
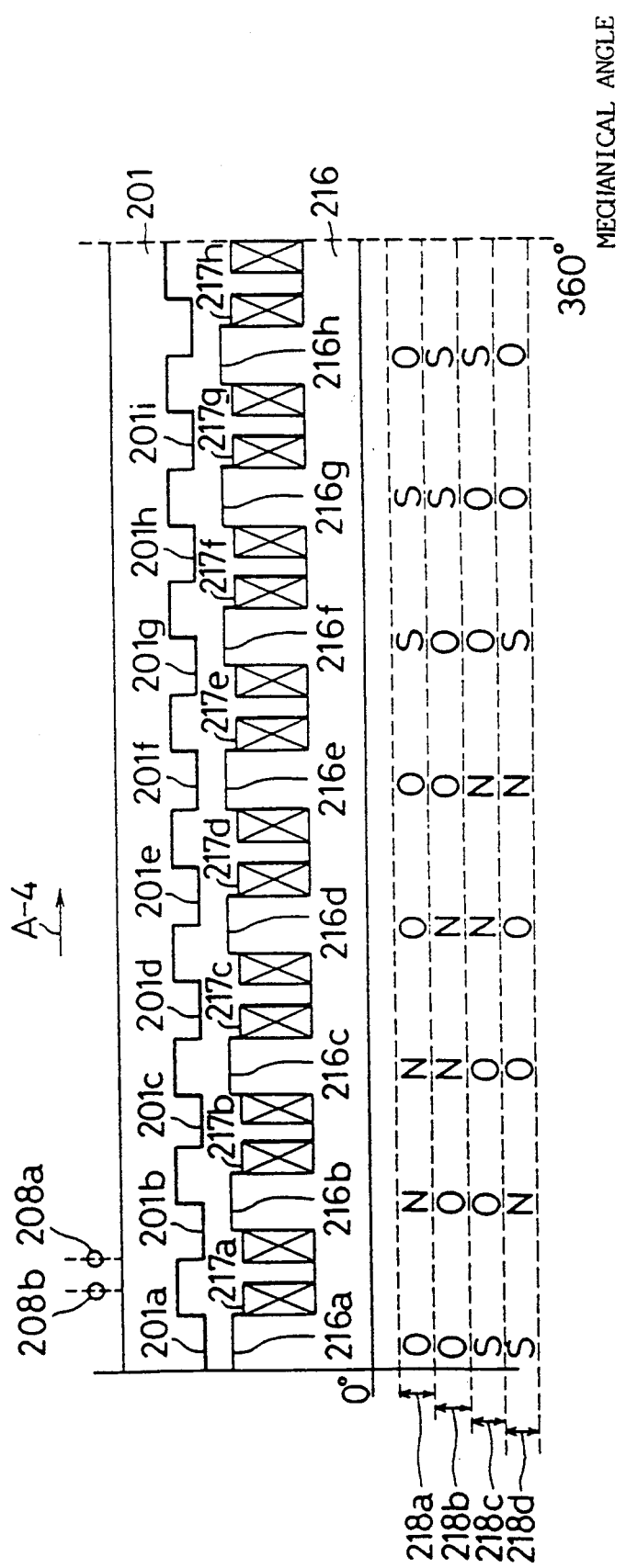
FIG. 15 is a development showing the motor of FIG. 14 along with position detecting elements.
Figure 17:
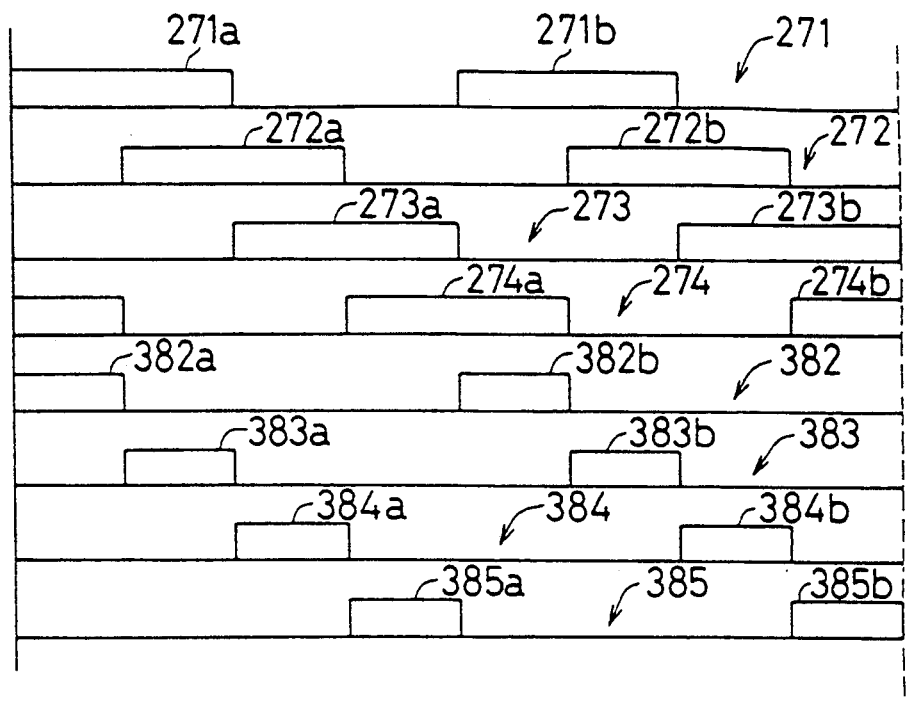
FIG. 17 is a timing chart showing various signals of a position detection device used in the fourth and fifth embodiments.
Figure 18:
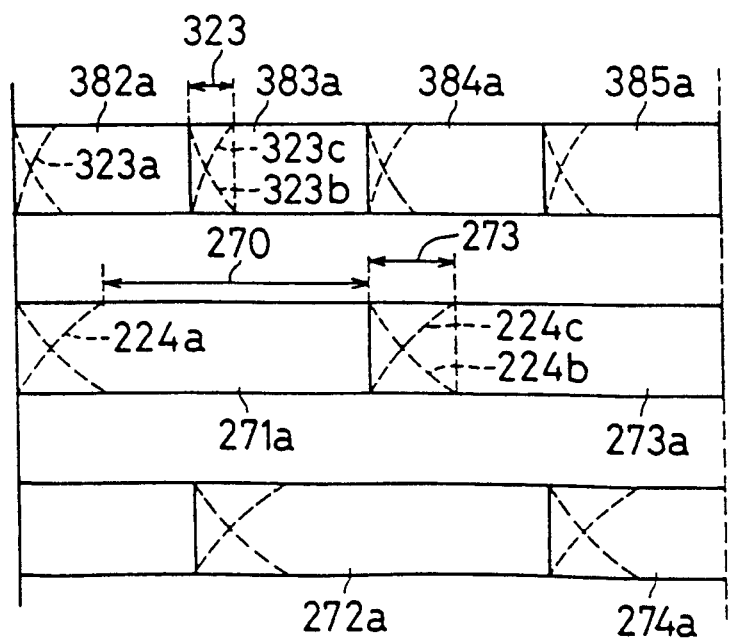
FIG. 18 is a graph showing an exciting current curve according to the fourth and fifth embodiments.

Referring to FIGS. 17 and 18, when the motor shown in FIGS. 14 to 16 is in operation, the current supply control circuit controls the current supply to the first to fourth exciting coil pairs K' to S', in accordance with the output and the inverted output of the detection coil 208a, the output and the inverted output of the detection coil 208b, and position detection signals 271 to 274, input respectively to input terminals 255a to 255d thereof. For example, when a high-level position detection signal 271a is generated, the current supply to the first exciting coil pair K' is started and thus the exciting current flowing through the coil pair K' rises as indicated by a curve 224a, in the following period indicated by symbol 270 chopper control is effected by the operational amplifier and the transistor, and when the signal 271a decays, the exciting current supplied to the coil pair K' falls as indicated by a curve 224b. In FIG. 18, a curve 224c represents the rising portion of the exciting current flowing through the coil pair L' in accordance with the high-level position detection signal 273a. Similarly, the exciting currents relating to the signals 272a and 274a rise and fall as indicated by the dashed lines.

In this embodiment, the width of the current supply is larger than 180 degrees as a result of the discharging of the magnetic energy stored in the exciting coils, giving rise to the possibility of counter-torque being caused. Therefore, the detection coils 208a and 208b are arranged on a side advanced by about 30 degrees, as mentioned above, to advance the time of starting the current supply and thereby prevent the occurrence of counter-torque.

Next, a two-phase reluctance motor according to a fifth embodiment of this invention will be described.

Figure 19:
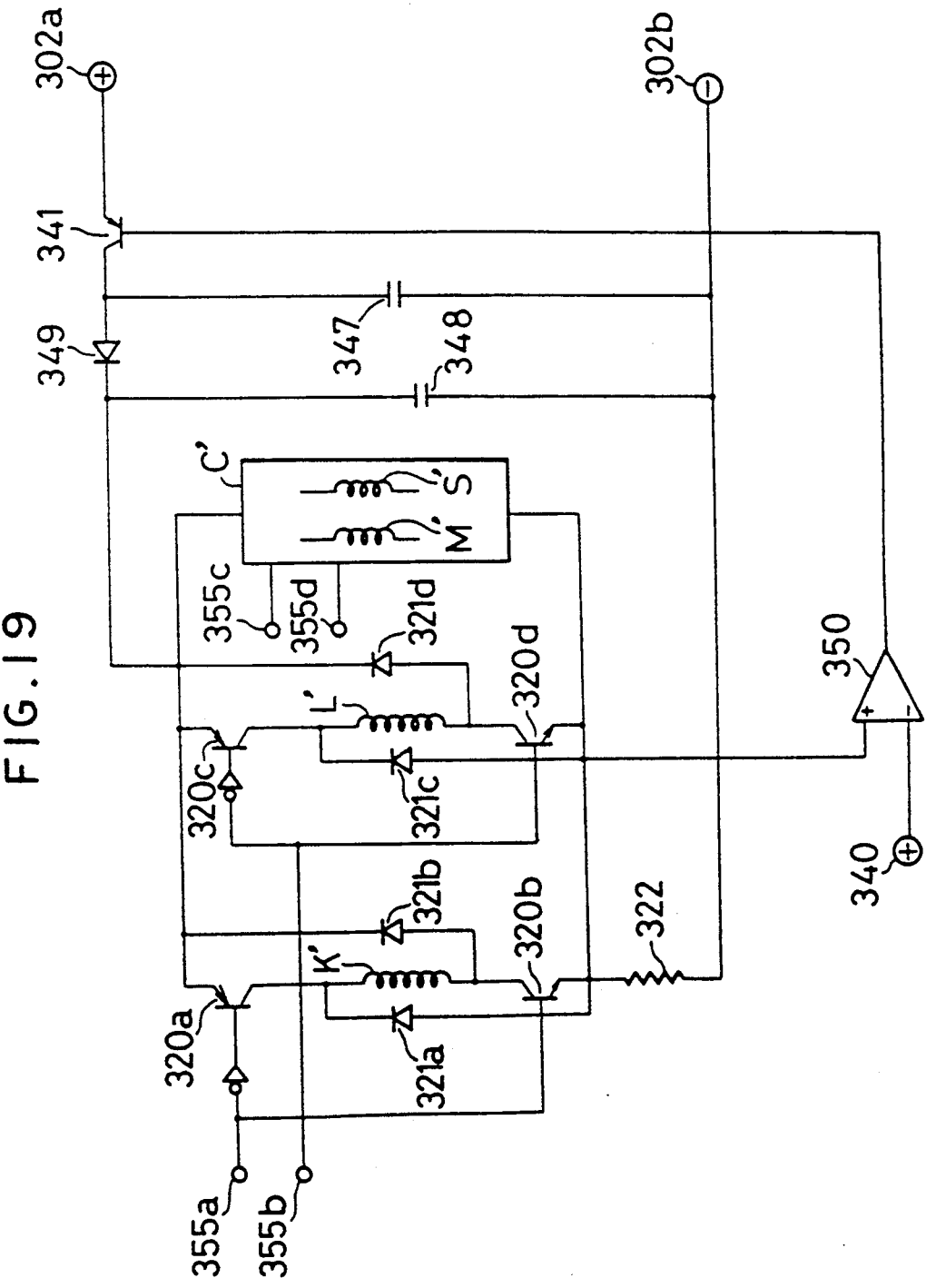
FIG. 19 is a schematic circuit diagram showing a current supply control circuit provided in a motor according to a fifth embodiment of this invention.

The motor of this embodiment comprises a position detection device (not shown) similar to the device shown in FIG. 10 and also similar to the position detection device used in the fourth embodiment, and a current supply control circuit shown in FIG. 19. The position detection device includes a plurality of OR circuits for generating position detection signals 382 to 385 (FIG. 17) corresponding respectively to the logical sum of the position detection signals 271 and 274 in the fourth embodiment, the logical sum of the signals 271 and 272, the logical sum of the signals 272 and 273, and the logical sum of the signals 273 and 274, the signals produced being supplied to input terminals 355a to 355d of the current supply control circuit, respectively. Position detection coils corresponding to the elements 208a and 208b in FIG. 15, respectively, are arranged such that the middle of the generation period of each high-level position detection signal coincides with the time at which the motor output torque produced as a result of the current supply to the individual exciting coils in maximum.

The motor operates basically in the same manner as that according to the fourth embodiment. Namely, an electric current is sequentially supplied to the four exciting coil pairs K', M', L' and S' in the order mentioned, over an electrical angle of 90 degrees for each, in accordance with the aforesaid position detection signals 382 to 385. The motor is therefore capable of high-torque, high-speed operation with a high efficiency.

More specifically, on turning on the power of the motor, if a high-level position detection signal 382a (FIG. 17), for example, is input to the current supply control circuit, the current supply to the exciting coil pair K' is started and accordingly the exciting current rises as indicated by a curve 323a (FIG. 18). After this, the chopper control of the exciting current is effected by an operational amplifier 350 and a transistor 341, and a capacitor 347 is charged and discharged in accordance with this control action, as in the cases of the above-described embodiments. When the high-level signal 382a is extinguished, an electric current flows through a path including diodes 321a and 321b, due to the magnetic energy stored in the exciting coil pair K', whereby a capacitor 348 is charged while the stored magnetic energy is extinguished as indicated by a curve 323b.

Then, the current supply to the exciting coil pair M' is started in accordance with a position detection signal 383a generated simultaneously with the extinction of the signal 382a. In this case, the magnetic energy stored in the exciting coil pair K' is utilized for the storage of magnetic energy in the exciting coil pair M', thereby shortening the fall time of the exciting current flowing through the coil pair K' indicated at 323, and the rise time of the exciting current supplied to the coil pair M'. Namely, the exciting current supplied to the coil pair M' quickly rises as indicated by a dashed line 323c. Like the foregoing embodiments, the width of the period 323 can be varied by selecting the capacitance of the capacitor 348, and is set to a value suited to the operating speed of the motor. The exciting current is maintained at a preset value during the current supply period, and is quickly decreased with the extinction of the position detection signal 383a. The current supply control is similarly effected with respect to the exciting coil pairs L' and S'.

Next, a motor according to a sixth embodiment of this invention will be described.

Figure 20:
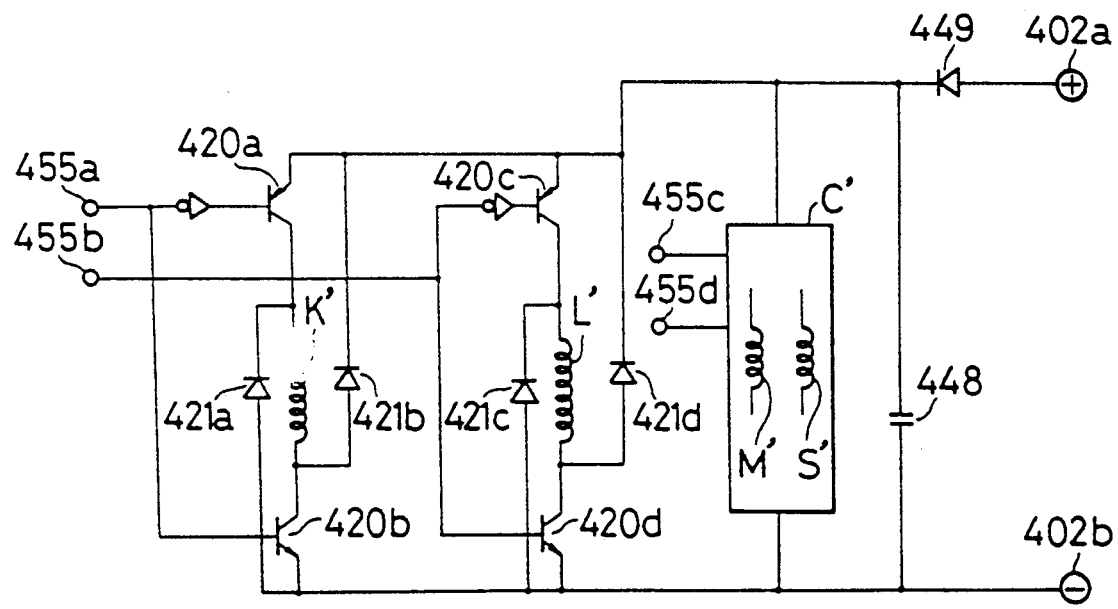
FIG. 20 is a circuit diagram showing a current supply control circuit used in a sixth embodiment of this invention.

The motor of this embodiment comprises a current supply control circuit (FIG. 20) which is fundamentally identical in arrangement with that shown in FIG. 19 but which differs therefrom in that it has no chopper circuit and thus is simpler in arrangement. In FIG. 20, similar numbering is employed to denote like elements appearing in FIG. 19, for example, numeral 455a represents the element corresponding to the element 355a in FIG. 19. This motor can be operated by a low-voltage power supply, such as a battery power supply, and therefore is suitably used as a drive source for a compact electric car. Preferably, the motor is used as a mere drive source on which an accurate output torque control is not performed.

On application of power to the motor, if, for example, a signal corresponding to the position detection signal 382a in FIG. 18 is supplied to an input terminal 455a of the current supply control circuit, the exciting current rises along a curve corresponding to the curve 323a. In this case, the rise time of the exciting current is long because of a large inductance of the exciting coil pair K', but an exciting current large enough to rotate the motor at a low speed and corresponding to the supply voltage from direct current power supplies 402a and 402b is passed, whereby the motor is started. Subsequently, a position detection signal corresponding to the signal 383a is supplied to the input terminal 455c, and an electric current is supplied to the exciting coil pair M'. Thereafter, the motor is accelerated with the application of position detection signals corresponding to the signals 384a and 385a.

When the position detection signal corresponding to the signal 382a, for example, falls thereafter, transistors 420a and 420b are turned off. At this time, the magnetic energy stored in the exciting coil pair K' is discharged with lapse of time in the form of an electric current varying along a curve corresponding to the curve 323b. Due to the action of a diode 449 and a capacitor 448, however, most part of the discharged magnetic energy flows to the exciting coil pair M' which is turned on by then. As a result, the exciting current flowing through this coil pair quickly rises along a curve corresponding to the curve 323c, whereby the occurrence of reduced-torque and counter-torque is suppressed and a high-speed operation of the motor is permitted.

A seventh embodiment according to this invention will be now described.

Figure 21:
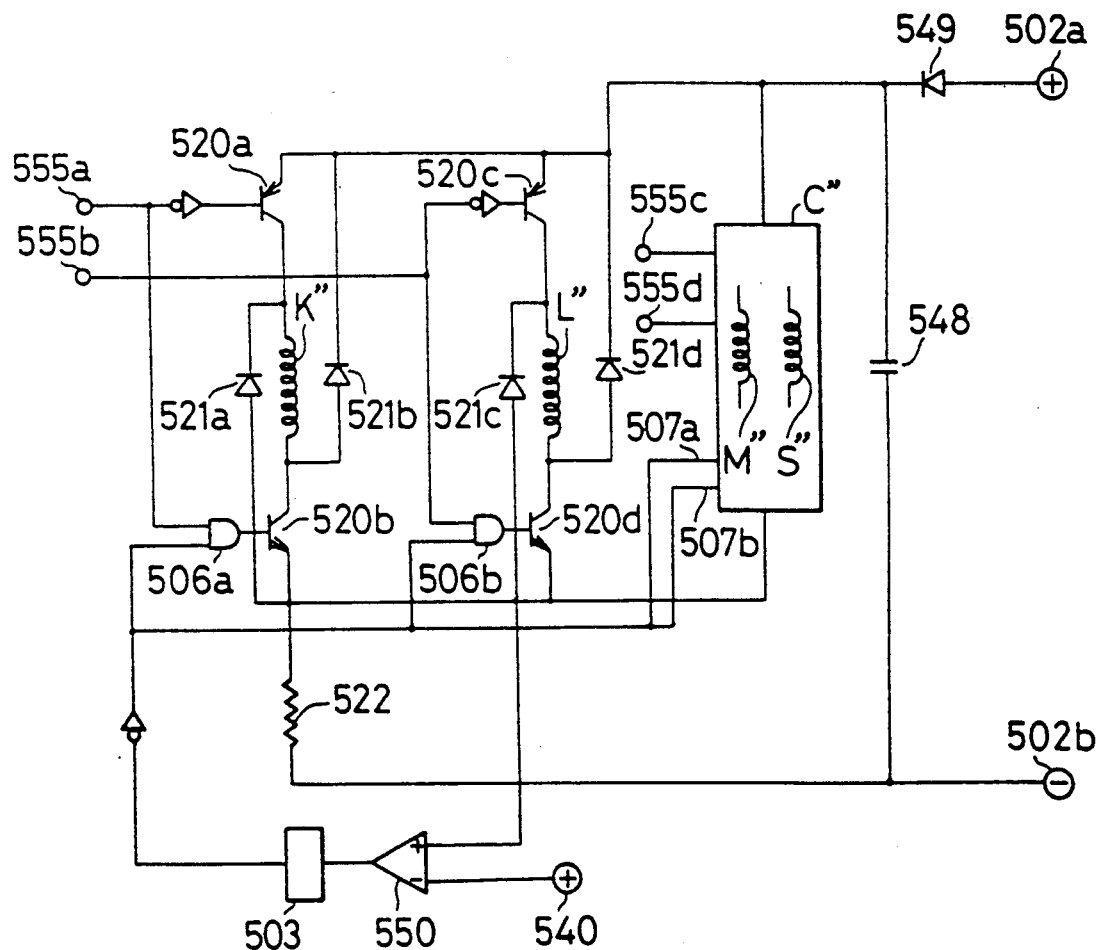
FIG. 21 is a circuit diagram showing a current supply control circuit according to a seventh embodiment of this invention.

The motor of this embodiment comprises a current supply control circuit, shown in FIG. 21, which includes a chopper circuit, unlike the current supply control circuit of FIG. 20. The chopper circuit differs from the counterparts in the foregoing embodiments in that it uses a monostable circuit. The numbering of the elements in FIG. 21 is similar to that of FIG. 20.

During operation of the motor, when the voltage across a resistor 522 representing an exciting current flowing through, e.g., an exciting coil pair K", namely, the voltage applied to the positive input terminal of an operational amplifier 550, becomes larger than the reference voltage applied to the negative input terminal of the same operational amplifier, with an increase in the exciting current, a high-level output is sent from the operational amplifier 550 to a monostable circuit 503. The monostable circuit, which is driven by this high-level output, generates a high-level output which is inverted by an inverter and then applied to one input terminal of an AND circuit 506a. Accordingly, the AND circuit 506a is closed, so that the supply of the high-level position detection signal is interrupted and a transistor 520b is turned off, whereby the exciting current is reduced. The output of the monostable circuit 503 turns to low-level after the lapse of a predetermined time, and therefore, the AND circuit 506a is opened and the transistor 520b is rendered conductive, whereby the exciting current is increased. Namely, the aforesaid operation is repeatedly carried out by a chopper circuit composed of the operational amplifier 550, the monostable circuit 503 and the AND circuit 506a, so that the exciting current is controlled to the reference voltage applied to the reference voltage terminal. A similar control is effected with respect to the other exciting coil pairs L", M" and S", by chopper circuits composed of the elements 550 and 503, an AND circuit 506b, and AND circuits (not shown) incorporated in a block C" and respectively connected to input terminals 507a and 507b.

A three-phase reluctance motor according to an eighth embodiment of this invention will be described with reference to FIGS. 22 to 27. The feature of this motor resides in that the main body is small-sized and flat in shape, and that the arrangement is simplified by using two, not three, position detecting elements.

Figure 22:
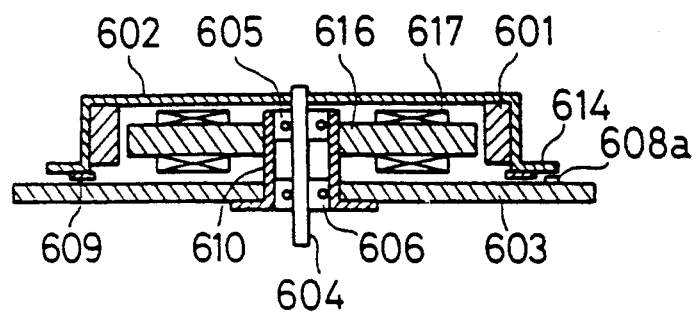
FIG. 22 is an axial sectional view of a three-phase reluctance motor according to an eighth embodiment of this invention.

As shown in FIG. 22, the main body of the motor has a base plate 603, and a rotary shaft 604 is rotatably supported by ball bearings 605 and 606 which are arranged in a cylindrical member 610 fitted into a hole bored through a central portion of the base plate 603. A cup-shaped rotating member 602, which is made of soft steel, is secured at the center thereof to an upper end of the rotary shaft 604, and a rotor 601 is secured to the inner peripheral surface of the rotating member 602. The rotating member 602 may be made of an aluminum plate so that the eddy-current loss mentioned later, and thus, the position detection output may be increased.

The rotor 601 and a stator 616, each made of a laminate of silicon steel plates, have seven salient poles 601a to 601g and six magnetic poles 616a to 616g, respectively, facing each other with a gap of about 0.15 mm. The widths of the salient poles and magnetic poles are respectively set to 20 mm and 15 mm, for example. Exciting coils 617a to 617f are respectively fitted to the magnetic poles.

Figure 24:
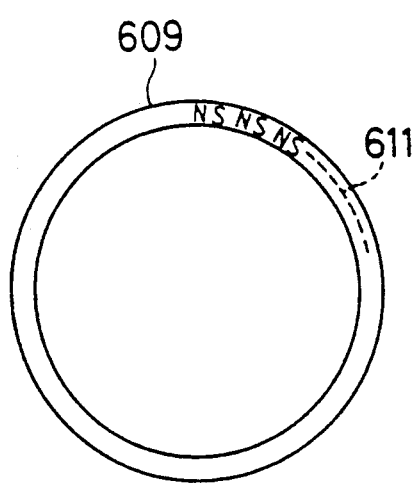
FIG. 24 is a schematic plan view of a ring magnet in FIG. 22.
Figure 25:
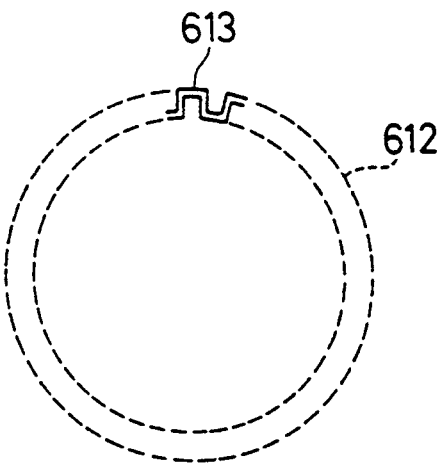
FIG. 25 is a schematic plan view of an induction coil provided at a peripheral wall of a rotor in FIG. 22.
Figure 26:
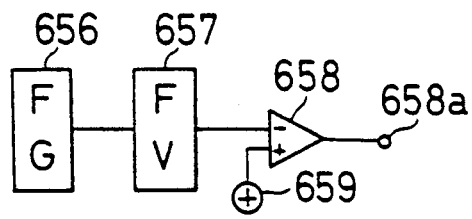
FIG. 26 is a schematic circuit diagram of a constant-speed control system including a frequency generator composed of a ring magnet and an induction coil.

A ring magnet 609 is secured to the bottom surface of a bent portion 614 extending from the peripheral wall of the rotor 601 and has forty N poles and forty S poles (FIG. 24). Numeral 611 denotes the N and S poles omitted from the figure. An induction coil 613 (FIG. 25) is arranged on a surface portion of the base plate 603 facing the magnet 609, and comprises an alternately bent conductor formed by a printed wiring technique. Numeral 612 denotes the portion of the conductor omitted from FIG. 25. The magnet 609 and the induction coil 613 constitute a frequency generator (indicated at 656 in FIG. 26) for generating an electrical signal whose frequency is proportional to the rotational speed of the rotating member 602. The output terminal of the frequency generator 656 is connected to an input terminal of a frequency-voltage converter 657, whose output terminal is connected to a negative input terminal of an operational amplifier 658 which is supplied at a positive input terminal with a reference positive voltage representing a preset rotational speed from a terminal 659. An output terminal 658a of the operational amplifier 658 is connected to a terminal corresponding to the reference voltage terminal 140 of the current supply control circuit in FIG. 11.

Figure 27:
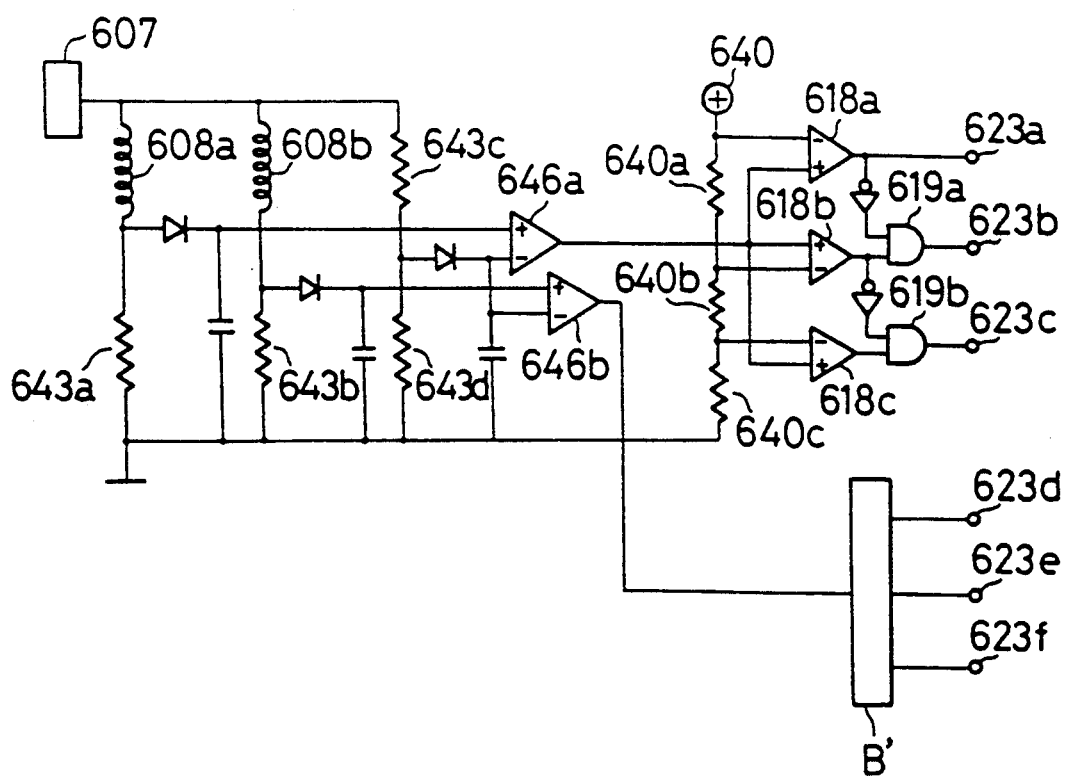
FIG. 27 is a circuit diagram showing a position detection device according to the eighth embodiment.

The motor further comprises a position detection device shown in FIG. 27, which includes detection coils 608a and 608b secured to the base plate 603. The detection coils are opposed to stepped conductors 614a to 614c (FIG. 23) formed in the bent portion 614 extending from the peripheral wall of the rotating member and are spaced from each other with a predetermined angle of 60+120 n (n is 0 or a positive integer, and in this embodiment, n=1) therebetween. The stepped conductors are formed by pressing and each have a width of 120 degrees, wherein the conductor 614a is the remotest from the detection coils and the conductor 614c is the closest to the same. In FIG. 23, symbol R denotes the stepped conductors omitted from the figure.

The detection coils 608a and 608b cooperate with resistors 643a to 643d to form bridge circuits, respectively, each bridge circuit being connected at an input side to an oscillator 607 having an oscillation frequency of 1 to 5 MHz and connected at an output side to corresponding ones of operational amplifiers 646a and 646b through a low-pass filter composed of a capacitor and a diode. The output terminal of the operational amplifier 646a is connected to the positive input terminals of operational amplifiers 618a to 618c, the negative input terminals of which are connected to a reference voltage terminal 640. In FIG. 27, numerals 640a to 640c denote resistors serving as a voltage divider.

The output terminal of the operational amplifier 618a is connected to an output terminal 623a of the position detection device and also connected through an inverter to one input terminal of an AND circuit 619a. The output terminal of the operational amplifier 618b is connected to the other input terminal of the AND circuit 619a and also connected through an inverter to one input terminal of an AND circuit 619b. The output terminal of the operational amplifier 618c is connected to the other input terminal of the AND circuit 619b. The output terminals of the AND circuits 619a and 619b are respectively connected to output terminals 623b and 623c of the position detection device. The output terminal of the operational amplifier 646b is connected to an input side of a block B' including elements corresponding to the aforesaid various elements 618a to 618c, 619a, 619b, and 640a to 640c. The block B' is connected at an output side to output terminals 623d to 623f of the position detection device.

The motor comprises a current supply control circuit (not shown) having the same arrangement as the current supply control circuit shown in FIG. 11, and this circuit has six input terminals connected to the aforesaid terminals 623a to 623f of the position detection device, respectively.

The motor according to the eighth embodiment, shown in FIGS. 22 to 27, operates in substantially the same manner as the above-described motor of the third embodiment, and accordingly, the operation thereof will be described briefly.

At the start of the motor, the voltage applied to the positive input terminal of the operational amplifier 658 is higher than that applied to the negative input terminal of same, and thus, the voltage applied to the reference voltage input terminal (corresponding to the terminal 140 in FIG. 11) of the current supply control circuit rises to a maximum. Accordingly, the exciting current is at a maximum level, thus improving the starting characteristics of the motor. As the number of rotations of the motor thereafter reaches a level close to a preset number, the voltage applied to the negative input terminal of the operational amplifier 658 approaches the voltage applied to the positive input terminal of same. Accordingly, the output of the operational amplifier, which determines the exciting current, is correspondingly decreased, whereby the motor is operated at a constant speed to produce an output torque corresponding to a load.

During operation of the motor, a magnetic attractive force is produced between the salient poles of the rotor and the magnetic poles of the armature, thereby obtaining an output torque of the motor. Specifically, to explain this with reference to the salient pole 601a and the magnetic pole 616a, a force rotating the salient pole 601a is produced by the interaction between magnetic fluxes P, G and H shown in FIG. 28. These fluxes are considered leakage fluxes. In FIG. 28, the dashed arrows represent magnetic fluxes passing behind the salient pole 601a. When the salient pole 601a approaches the magnetic pole 616a, only the magnetic fluxes P and G are produced, and a torque similar to that indicated by the curve 142 in FIG. 12 is generated. Thereafter, as the salient pole comes into the magnetic pole, the magnetic flux H, i.e., the torque produced, is increased. The torque produced at this time can be expressed by the flat curve 142a in FIG. 12.

The generation of the position detection signals will be now described. When the detection coil 608a comes to a position opposed to the conductor 614a, the voltages applied to the positive input terminals of the operational amplifiers 618a to 618c from the operational amplifier 646a become higher than the voltages applied to the negative input terminals of the amplifiers 618a to 618c, and thus the operational amplifiers 618a to 618c produce high-level outputs. As a result, the AND circuits 619a and 619b are closed, and a high level position detection signal is output only from the output terminal 623a of the position detection device. When the detection coil 608b thereafter comes to a position opposed to the conductor 614b with rotation of the rotor 601 and the rotating member 602, the voltages applied to the positive input terminals of the operational amplifiers 618a to 618c become lower than the voltage applied to the negative input terminal of the operational amplifier 618a, but are still higher than the voltages applied to the negative input terminals of the operation amplifiers 618b and 618c. As a result, the output of the operational amplifier 618a turns to low-level, while the outputs of the operational amplifiers 618b and 618c are maintained at high-level. Accordingly, a high-level position detection signal is output only from the output terminal 623b. When the detection coil 608a becomes opposed to the conductor 614c, the voltages applied to the positive input terminals of the operational amplifiers 618a to 618c become lower than the voltages applied to the negative input terminals of the operational amplifiers 618a and 618b, but are higher than the voltage applied to the negative input terminal of the operational amplifier 618c, whereby a high-level position detection signal is output only from the output terminal 623c. This is the case with the detection coil 608b, and therefore, a high-level position detection signal having a width of 120 degrees is output sequentially from the terminals 623d to 623f. The motor operates thereafter in the same manner as the third embodiment described with reference to FIGS. 12 and 13, and accordingly, the description is omitted.

According to this embodiment, it is possible to obtain a motor having higher performance than, e.g., a direct current motor of 50 mm in diameter, 8 mm in height, having an output torque of about 300 to 500 gcm and using a magnet made of a rare earth metal. Accordingly, the motor of this embodiment is suitable for a drive source for driving a floppy disk, for example.

Figure 29:
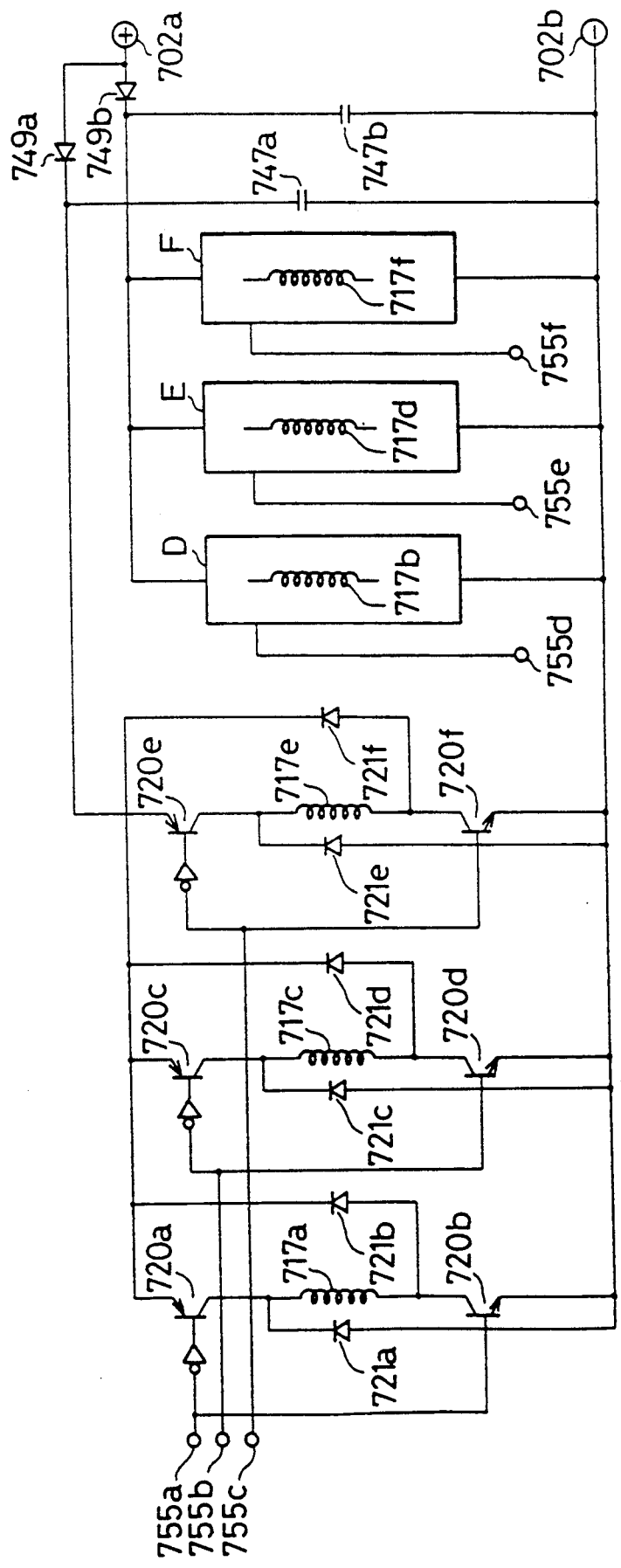
FIG. 29 is a circuit diagram of a current supply control circuit provided in a motor according to a ninth embodiment of this invention.

A motor according to a ninth embodiment of this invention comprises a main body, position detecting elements and a position detection device (neither is shown), which are respectively identical in arrangement to the main body, the position detecting elements and the position detection device shown in FIGS. 8 to 10. and also comprises a current supply control circuit shown in FIG. 29. The current supply control circuit is equivalent to the circuit shown in FIG. 11, except that it has no chopper circuit. In FIG. 29, the numbering of the elements is similar to that of FIG. 1. The motor of this embodiment operates fundamentally in the same manner as that of the third embodiment shown in FIGS. 8 to 11. FIG. 30, similar to FIG. 13, shows changes in the exciting current according to the current supply control, with lapse of time.

Now, two modifications of the position detection device, provided in the motor of the ninth embodiment, will be described with reference to FIGS. 31 and 32. These position detection devices are capable of continuously generating a series of high-level position detection signals without interruption, to thereby improve the starting characteristic of the motor.

In FIG. 31, numerals 718a, 718c, 718d and 718f represent corresponding ones of the output terminals 118a to 118f of the position detection device in FIG. 10, and numerals 718a' to 718f' represent terminals respectively connected to input terminals 755a to 755f of the current supply control circuit in FIG. 29. The terminal 718a is connected to the terminal 718a' and the anode of a diode, which in turn is connected to the terminal 718b' through an inverter 708a. The terminal 718c is connected to the terminal 718c' and also to the anode of a diode which in turn is connected to the terminal 718b' through the inverter 708a. Similarly, the terminal 718d is connected to the terminal 718d' and also connected through a diode and an inverter 708b to the terminal 718e', and the terminal 718f is connected to the terminal 718f' and also connected through a diode and the inverter 708b to the terminal 718e'.

According to the above arrangement, a high-level position detection signal is output from the terminal 718b' except when a high-level position detection signal is output from the terminals 718a' and 718c' to the current supply control circuit, and a position detection signal is output from the terminal 718e' except when the position detection signal is output from the terminals 718d' and 718f. Consequently, a series of signals are delivered without interruption.

Figure 32:
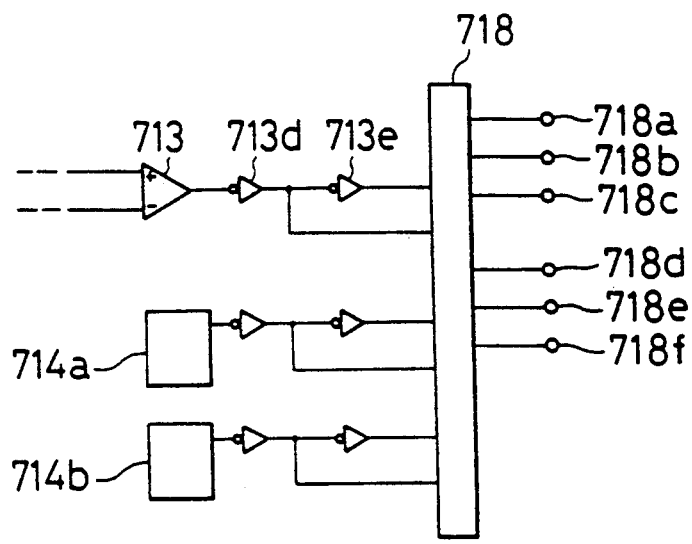
FIG. 32 is a partial circuit diagram showing another modification of the position detection device.

In FIG. 32, numerals 713, 714a, 714b, 718, and 718a to 718f denote elements respectively corresponding to the elements 113, 114a, 114b, 118, and 118a to 118f in FIG. 10. The position detection device shown in FIG. 32 differs from that of FIG. 10 in that two inverters are arranged between the logic circuit 718 and an operational amplifier (not shown) incorporated in each of the operational amplifier 713 and the blocks 714a and 714b. In the devices of the type shown in FIGS. 10 and 32, the detection coil associated with each operational amplifier has a diameter of not negligible length relative to the width of the salient poles, and therefore, the output of each operational amplifier shows a curve inclined at the rising and falling portions thereof. Accordingly, there is a possibility that an interruption may exist between a series of high-level position detection signals output from the terminals 118a to 118f of FIG. 10. According to the device of FIG. 32, on the other hand, perfectly rectangular waves of opposite phases are produced by the three pairs of inverters, and are supplied to the logic circuit 718, whereby the aforesaid interruption between the signals is eliminated.

A three-phase half-wave motor according to a tenth embodiment of this invention will be described with reference to FIGS. 33 to 35.

The primary difference between the motor of this embodiment and that of the above-described ninth embodiment is that the main body of the motor is reduced in size.

Figure 33:
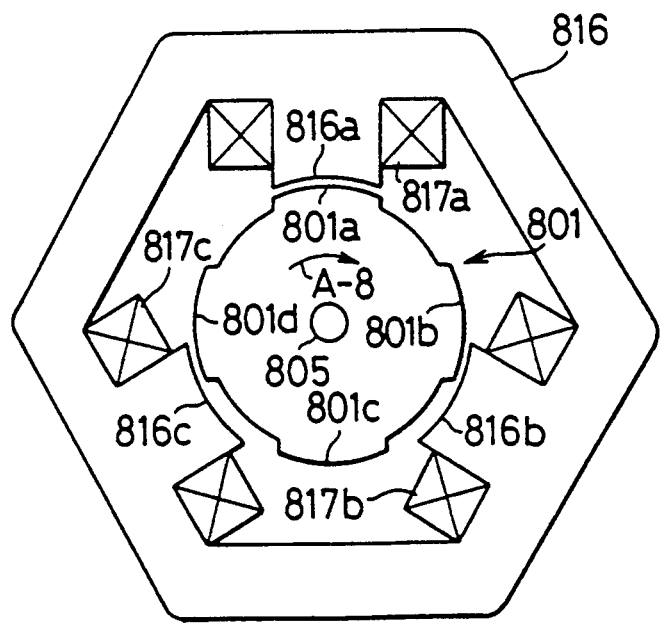
FIG. 33 is a view showing a motor according to a tenth embodiment of this invention.
Figure 34:
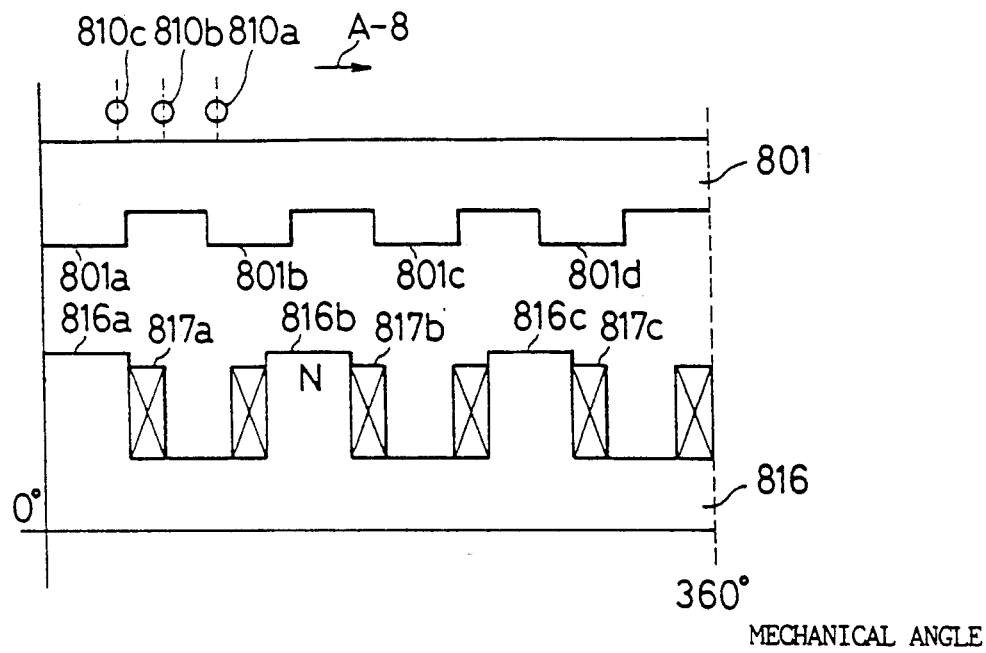
FIG. 34 is a diagram showing in development the motor of FIG. 33.
Figure 35:
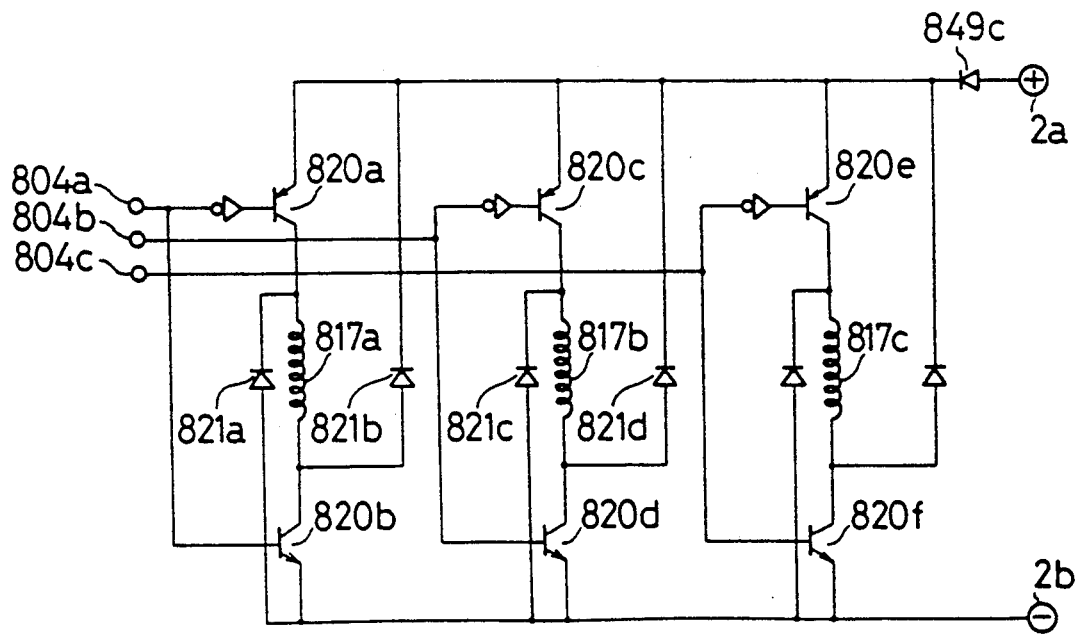
FIG. 35 is a circuit diagram showing a current supply control circuit used in the tenth embodiment.

As shown in FIGS. 33 and 34, the main body of the motor comprises a rotor 801 having four salient poles 801a to 801d and a rotary shaft 805, and an armature 816 having first- to third-phase magnetic poles 816a to 816c on which first- to third-phase exciting coils 817a to 817c are respectively fitted. To the armature are secured detection coils 810a to 810c which constitute a position detection device in cooperation with a circuit (not shown) equivalent to that shown in FIG. 10, 31 or 32 and having three output terminals corresponding, for example, to the terminals 118a to 118c. The output terminals of the position detection device are connected to input terminals 804a to 804c of a current supply control circuit shown in FIG. 35, respectively. The current supply control circuit has substantially the same arrangement as that shown in FIG. 7 and differs therefrom in that it does not have an element corresponding to the capacitor 19 in FIG. 7. The numbering of the elements in FIG. 35 is similar to that in FIG. 7. The current supply control circuit carries out a current supply control substantially in the same manner as aforesaid with reference to the various embodiments, in accordance with position detection signals corresponding to the signals 131 to 133 shown in FIG. 12, to thereby control the exciting currents as shown in FIG. 30 similar to FIG. 13. The control action is apparent from the description of the third embodiment given with reference to FIG. 13, and accordingly, a description of FIG. 30 is omitted.

Next, a motor according to an eleventh embodiment of this invention will be described.

Figure 36:
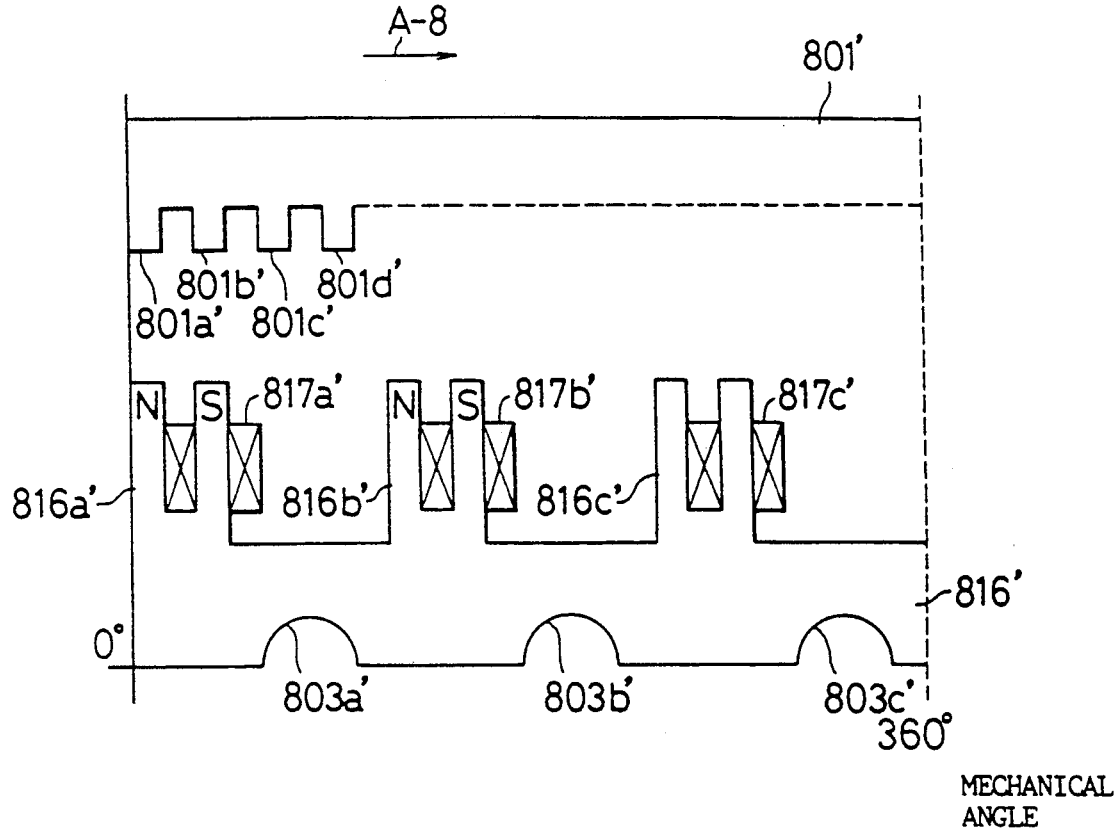
FIG. 36 is a view showing a motor according to an eleventh embodiment of this invention.

The motor of this embodiment differs from that of the tenth embodiment in that the output torque is largely increased. Specifically, according to the motor of this embodiment, as shown in development in FIG. 36, the armature of the motor main body has magnetic poles 816a' to 816c' each having a pair of magnetic pole pieces, and the magnetic pole pieces of each pair are spaced from each other by an electrical angle equivalent to the width of the salient poles (some of them are shown at 801a' to 801d'). Cutouts 803a' to 803c' are formed in the armature 816' each in a position corresponding to an intermediate portion between adjacent magnetic poles.

During operation of the motor, according to the above-described tenth embodiment, when the magnetic pole 816b, for instance, is excited to act as N pole, then the magnetic flux passing the magnetic pole 816b branches off into two passing the salient poles 801a and 801d, respectively, and a torque produced due to the interaction between the magnetic pole 816c and the salient pole 801d acts as a counter-torque and reduces the output torque. According to the motor of the eleventh embodiment, on the other hand, when an electric current is supplied, e.g., to the exciting coil 817b', the magnetic flux passing the magnetic pole 816b' is closed via the salient poles, and accordingly, the magnetic reluctance is small, with the result that the magnetic attractive force acting between a magnetic pole and a salient pole is increased. Since the magnetic reluctance is increased at the regions corresponding to the cutouts 803a' to 803c' of the armature 816', the magnetic flux passing a magnetic pole in no way branches off to the other magnetic poles. According to this arrangement, the output torque is about four times larger, compared to the arrangement of magnetic poles shown in FIG. 34.

Preferably, the width between a pair of magnetic pole pieces in each magnetic pole is increased and the number of salient poles is reduced, to thereby ensure a larger space for the exciting coils. The main body of the motor according to this embodiment is used, for example, with the detection coils of FIG. 34 and the current supply control circuit of FIG. 35.

Now, a two-phase reluctance motor according to a twelfth embodiment of this invention will be described.

The motor of this embodiment comprises a main body (not shown) corresponding to that of the fourth embodiment, shown in FIG. 14, a position detection device (FIG. 37) corresponding to that shown in FIG. 10, and a current supply control circuit (FIG. 38) corresponding to that shown in FIG. 16.

Figure 37:
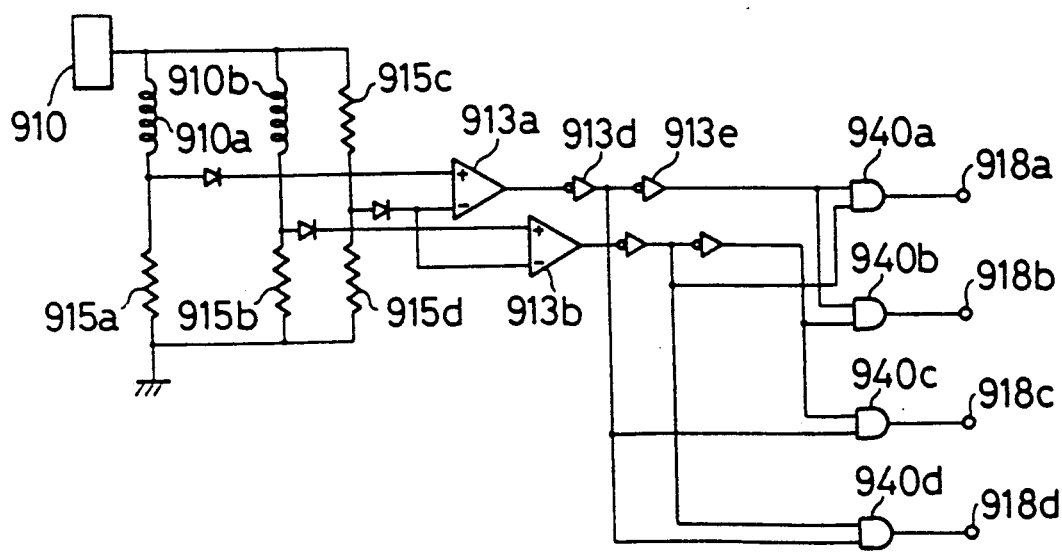
FIG. 37 is a circuit diagram showing a position detector provided in a motor according to a twelfth embodiment of this invention.
Figure 38:
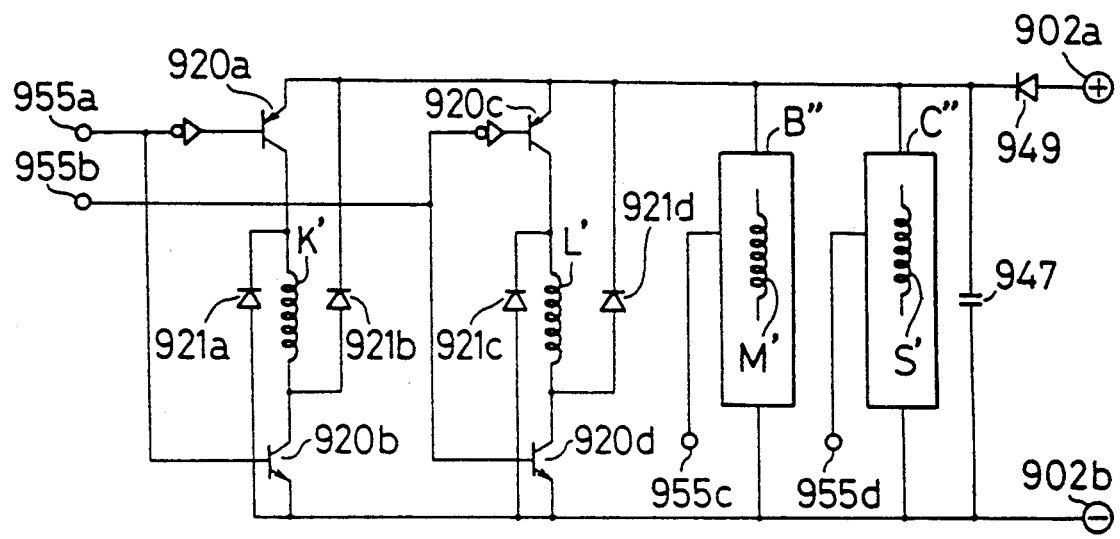
FIG. 38 is a circuit diagram showing a current supply control circuit used in the twelfth embodiment.

In the position detection device shown in FIG. 37, detection coils 910a and 910b are spaced from each other by (180+90) degrees, and smoothing capacitors for rectification, corresponding to the capacitors 112a and 112b in FIG. 10, are omitted. The capacitors are dispensable because the inputs to operational amplifiers 913a and 913b are previously rectified by diodes arranged before the operational amplifiers, and by omitting the capacitors the integration of the circuit is facilitated. Inverters 913d and 913e corresponding to the inverters 713d and 713e in FIG. 32 are arranged after the operational amplifier 913a, and similarly, two inverters are arranged after the operational amplifier 913b. AND circuits 940a to 940d function similar to the logic circuit 718 in FIG. 32. The current supply control circuit of FIG. 38 has a basic arrangement identical to that of the circuit in FIG. 16; but differs therefrom in that the chopper circuit is omitted. In FIG. 38, symbols B" and C" represent current supply control circuits for the exciting coil pairs M' and S', respectively.

Figure 39:
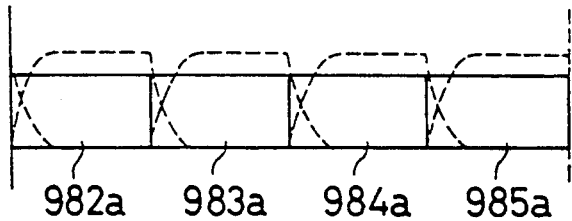
FIG. 39 is a graph showing a position detection signal from the position detector of FIG. 37 and an exciting current.

The operation of the motor according to this embodiment is substantially the same as that of the motor of the aforementioned fourth embodiment. For instance, the operational amplifiers 913a and 913b in FIG. 37 output rectangular-wave signals corresponding respectively to the signals 271 and 272 in FIG. 17. The inverter 913d arranged after the operational amplifier 913a and the inverter arranged after the operational amplifier 913b provide rectangular-wave signals corresponding respectively to the signals 273 and 274 in FIG. 17. The AND circuits 940a to 940d provide rectangular-wave signals corresponding respectively to the signals 382 to 385 in FIG. 17. The signals from the AND circuits each turn to high-level with a period of 360 degrees (illustrated in FIG. 39 with numerals 982a to 985a), and each high-level signal has a width of 90 degrees. Like the above-described various embodiments, in accordance with a series of high-level signals mentioned above, an electric current is supplied to corresponding ones of the exciting coil pairs K', L', M' and S', such that the exciting current varies along the curve shown in FIG. 39. As described in connection with the position detection device of FIG. 32, these high-level signals are generated without interruption, whereby the starting characteristic of the motor is ensured.

As in the cases of the above-described various embodiments, the capacitor 947 is charged up to a level higher than the power supply voltage by the magnetic energy stored in the exciting coil pairs and supplied thereto through the diodes 921a, 921b, etc., whereby the exciting current flowing through the coil pair to which the current supply is interrupted quickly falls and the occurrence of counter-torque is prevented. The voltage of the charged capacitor is applied to the coil pair for which the current supply has been started, thereby quickly raising the exciting current and preventing the occurrence of reduced-torque.

In the above description of the various embodiments, not all features are specifically pointed out in respect of the arrangement, operation, and advantageous effects of the individual embodiments for the sake of simplicity, but, of course, each embodiment has the features mentioned with reference to its related embodiments.

This invention is not limited to the above-described embodiments alone, and various modifications are possible.

For instance, in the above embodiments, the transistors (e.g., the transistor 20a) serving as switching elements may be replaced by other semiconductor elements. Further, in the first embodiment, the transistors 20a, 20c and 20e alone are turned on and off by the chopper control; alternatively, the transistors 20a and 20b, the transistors 20c and 20d and the transistors 20e and 20f may be turned on and off. Similar modifications are possible for the other embodiments. Furthermore, the position detection signals of individual phases may be produced by conventional means provided in a conventional Y-connection direct current motor and comprising AND circuits. In this case, however, it is likely that an interruption may exist between the position detection signals, for example, between the signals 28a and 29a, causing a disadvantage in the case of a three-phase half-wave motor in that the starting torque cannot be generated.

Although in the foregoing embodiments, the detection coils are arranged in a facing relation to the salient poles of the rotor to obtain the position detection signals, an aluminum plate having the same shape as the rotor may be provided for synchronous rotation with the rotor and the detection coils may be arranged to be opposed to projections of the aluminum plate. Further, magnetic reluctance elements may be arranged in a facing relation to the magnetic poles of a magnet rotor rotatable synchronously with the rotor, so that output changes of the magnetic reluctance elements can be detected as the position detection signals.

To further reduce the leakage magnetic flux passing the unexcited magnetic poles during a current supply to the exciting coils of individual phases, each of the magnetic poles of the armature may be constituted by a pair of magnetic pole teeth having the same width and arranged at equal distances, such that the paired magnetic pole teeth are magnetized to be N and S poles, respectively, to extinguish the leakage flux from one magnetic pole tooth by the other. In this case, in the first embodiment, for example, sixteen salient poles may be provided in the rotor 1, whereby the motor can produce two-fold output torque. Moreover, each of the magnetic poles of the armature may be constituted by n pairs of magnetic pole teeth having the same width and arranged at equal distances and the number of the salient poles of the rotor may be increased correspondingly, whereby the output torque can be increased n times.

In the above embodiments, a pair of exciting coils have different numbers of winding to eliminate rotational vibration. Alternatively, in the first embodiment, for example, the rotary shaft 5 may be supported by the bearings such that it is deviated to one side (upper right side) of the dashed line 3 in FIG. 1 by about 20 μm. In this case, the gap between the magnetic pole 16b and the salient pole 1b is the smallest, while the gap between the magnetic pole 16a and the salient pole 1a and that between the magnetic pole 16c and the salient pole 1d are slightly larger. As a result, during rotation, the rotor 1 receives only the force acting in the upper-right direction with respect to the dashed line 3, whereby the rotational vibration is prevented. Alternatively, the length of projection of the magnetic poles 16a to 16c may be increased by about 20 μm, compared to the length of projection of the other magnetic poles, to obtain a smaller gap and thus achieve a similar effect of eliminating the rotational vibration.

In the first embodiment, a diode equivalent to the aforesaid reverse current-preventing diode 18 may be inserted at the direct current power supply positive terminal (2a) side of the current supply control circuit (FIG. 4), in which case, the motor of the first embodiment can be operated also by a low-voltage direct current power supply. In the foregoing embodiments, furthermore, although the required number of reverse current-preventing diodes are inserted at the direct current power supply positive terminal side, they may be inserted at the direct current power supply negative terminal side.

In the second embodiment, the current supply starting time may be advanced as in the first embodiment, to make the output torque characteristic even.

In the current supply control circuit for the motor according to the fourth embodiment, a differentiating circuit may be provided at the output terminal of the operational amplifier 240a, followed by a monostable circuit having an output side connected to the base of the transistor 241a, and further, a differentiating circuit and a monostable circuit may be arranged likewise between the operational amplifier 240b and the transistor 241b. In this case, the differentiating circuit generates a pulse in response to a high-level output of the operational amplifier 240 which is produced when the exciting current flowing through the exciting coil pair K' becomes larger than the preset value corresponding to the reference voltage applied to the terminal 240. In response to the pulse from the differentiating circuit, the monostable circuit produces a high-level output of a predetermined width, which is supplied to the base of the transistor 241c, making the transistor turned off. Thereafter, when the exciting current drops below the preset value, the transistor is again turned on. This operation is repeated to effect a chopper control. Similar chopper control is executed for the other exciting coil pairs. The above modification is possible with respect to the third embodiment.

In the fifth embodiment, the logical sum of adjacent ones of the position detection signals in the fourth embodiment is employed as the position detection signal. Alternatively, a differential pulse generated in accordance with the rise of one of adjacent signals and that generated in accordance with the fall of the other may be input to the set input terminal and reset input terminal of the flip-flop circuit, so that a signal from the set output terminal of this flip-flop circuit may be used as the position detection signal. In this case, a series of high-level position detection signals can be continuously generated and the motor can be self-started with reliability. In this arrangement, if the fall of the exciting current is delayed, no counter-torque is caused due to such delay.

The sixth embodiment uses a current supply control circuit which is equivalent to the current supply control circuit of the fifth embodiment but with the chopper circuit omitted. This current supply control circuit can be used in the third and fourth embodiments. Further, the chopper circuit described with reference to the seventh embodiment may be provided in the fourth and fifth embodiments.

Although in the eighth embodiment, the rotor is arranged radially outward of the armature, it may be arranged radially inward of same. Furthermore, in the eighth embodiment, two detection coils are used as the position detecting elements to reduce the cost and improve the heat resistance. Alternatively, it is possible to employ the combination of a rotating member having N and S poles and a non-magnetized portion, each with a width of 120 degrees, and two Hall elements.

Figure 40:
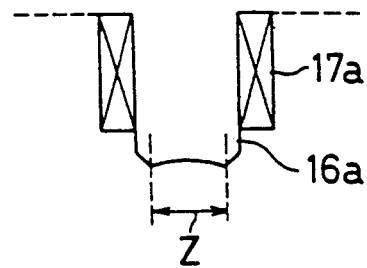
FIG. 40 is a view showing a modified form of the magnetic pole.

Moreover, a magnetic pole having the shape shown in FIG. 40 may be used to increase the output torque of the motor. Namely, reluctance motors can produce an output torque proportional to the exciting current and larger than the output torque of magnet direct current motors, even after the excited magnetic poles are magnetically saturated, and this output torque is derived from the leakage flux, as explained with reference to FIG. 28. The shape of the magnetic pole 16a, shown in FIG. 40, was contrived taking these properties into account, wherein the width Z between the magnetic-path open ends of the magnetic pole 16a along the rotating direction of the rotor is smaller than the width of the magnetic pole. With this magnetic pole, the magnetic-pole open ends are oversaturated when a certain portion of the exciting coil 17a becomes saturated, and the leakage flux, and thus, the output torque are increased.

The aforementioned individual modifications are applicable to those embodiments which, though, are not specifically referred to in the above explanation of the modifications for the sake of simplicity.

I claim:

1. A reluctance motor including a rotor having a plurality of salient poles, and an armature having a plurality of magnetic poles to which exciting coils are respectively fitted, said reluctance motor comprising:

position detection devices for sequentially delivering position detection signals to respective ones of the exciting coils, in accordance with a rotational position of the rotor;

a direct current power supply;

a current supply control circuit, connected to said direct current power supply, for supplying an electric current sequentially to the exciting coils in accordance with the position detection signals;

energy storing means for storing the energy in a first one of the exciting coils when the current supply to said first one of the exciting coils is interrupted;

circuit means which causes magnetic energy stored in said energy storing means to flow into a second one of the exciting coils in which the current supply is started at the time of interruption of the current supply to said first one of the exciting coils, to thereby quickly extinguish the stored magnetic energy and quickly raise an exciting current flowing through said second one of the exciting coils, and a chopper circuit for interrupting the current supply to said first one of the exciting coils when the exciting current flowing through said first one of the exciting coils becomes larger than an upper limit value, and restarting becomes larger than an upper limit value, and restarting the current supply when the exciting current becomes lower than a lower limit value.

2. A reluctance motor including a rotor having a plurality of salient poles, and an armature having a plurality of magnetic poles to which exciting coils are respectively fitted, said reluctance motor comprising:

a position detection device for sequentially outputting a first plurality of position detection signals and a second plurality of position detection signals having predetermined phase differences with respect to the position detection signals of the first plurality of position detection signals in accordance with a rotational position of the rotor;

a direct current power supply;

a current supply control circuit, connected to said direct current power supply, for supplying an electric current sequentially to a first group of exciting coils in accordance with said first plurality of position detection signals, and supplying an electric current sequentially to a second group of exciting coils in accordance with said second plurality of position detection signals;

energy storing means for storing the energy in a first one of the exciting coils when the current supply to said first one of the exciting coils is interrupted;

circuit means which causes magnetic energy stored in said energy storing means to flow into a second one of the exciting coils in which the current supply is started at the time of interruption of the current supply to said first one of the exciting coils, to thereby quickly extinguish the stored magnetic energy and quickly raise an exciting current flowing through said second one of the exciting coils; and a chopper circuit for interrupting the current supply to said first one of the exciting coils when the exciting current flowing through said first one of the exciting coils becomes larger than an upper limit value, and restarting the current supply when the exciting current becomes lower than a lower limit value.

3. A reluctance motor according to claim 1 or 2, wherein the position detection device produces the position detection signals continuously and successively without superposing the position detection signals one upon another in time, said position detection signals each having a width corresponding to a predetermined electrical angle.

4. A reluctance motor according to claim 1 or 2, wherein the position detection device includes a plurality of position detecting elements secured to said armature and spaced from each other by a predetermined electrical angle for producing said position detection signals.

5. A reluctance motor according to claim 4, wherein said position detecting elements are each secured at such a position that said position detection device produces a position detection signal able supply to the current supply to the exciting coil during a maximum torque generation interval.

6. A reluctance motor according to claim 1 or 2, wherein said current supply control circuit includes transistors respectively connected to said exciting coils and turned on and off in accordance with said position detection signals.

7. A reluctance motor according to claim 1 or 2, wherein said circuit means includes a diode provided between said direct current power supply and said exciting coils, for preventing the magnetic energy from flowing back to said direct current power supply.

8. A three-phase half-wave reluctance motor including a rotor having salient poles, comprising:

exciting coils having first to third phases and having first and second ends;

a position detection device having three position detecting elements spaced from each other by an electrical angle of 120 degrees, for generating position detection signals of the first- to third-phase in accordance with rotational positions of salient poles of the rotor;

switching elements respectively connected to said first and second ends of said first- to third-phases of said exciting coils and each forming connection means in cooperation with said exciting coils associated therewith;

diodes inversely connected to respective ones of said switching elements;

a current supply control circuit, responsive to each of the position detection signals, for turning on a corresponding one of said switching elements for a period corresponding to a width of the position detection signal, for supplying an electrical current to a corresponding one of said first- to third-phases of said exciting coils;

energy storing means for storing the energy in a first one of the exciting coils when the current supply to said first one of the exciting coils is interrupted;

a chopper circuit for maintaining the electric current flowing through each of said exciting coils at a preset value corresponding to a reference voltage; and a direct current power supply for supplying said current supply control circuit with a voltage large enough to suppress a reduction of torque and a counter-torque, respectively, caused at a start and during an interruption of current supply to said exciting coils, said position detecting elements being secured to a stator and each of said position detecting elements located at such a position that said position detection device produces a position detection signal able to generate a maximum and even output torque of the motor by supplying an electric current to said first- to third-phase of said exciting coils.

9. A three-phase half-wave reluctance motor according to claim 8, further comprising a reverse current preventing diode connected in a forward direction to said direct current power supply, and wherein when one of successively generated position detection signals is extinguished and another one of said position detection signals is generated said reverse current preventing diode prevents magnetic energy stored in one of said first- to third-phases of said exciting coils corresponding to said one of said position detection signals from flowing back to said direct current power supply, said magnetic energy being stored in one of said exciting coils corresponding to said another one of said position detection signals, to thereby minimize the reduction of torque and counter-torque.

10. A three-phase half-wave reluctance motor according to claims 8 or 9, wherein the rotor has eight salient poles having the same width and arranged at equal distances, and said stator has six magnetic poles having the same width as said salient poles and arranged at equal distances with a small gap defined between said magnetic poles and the salient poles.

11. A three-phase half-wave reluctance motor according to claims 8 or 9, wherein said exciting coils comprise three pairs of exciting coils, each pair including two exciting coils connected to each other and mounted to two magnetic poles arranged symmetrically about a rotary shaft of the rotor, one exciting coil in each of said three pairs having a number of windings larger than that of the other exciting coil in the same pair by a predetermined number, such that a magnetic attractive force acting between said magnetic poles and the salient poles in a radius direction of the rotor is variable only within a machine angle range of 180 degrees.

12. A three-phase half-wave reluctance motor according to claims 8 or 9, wherein distances of gaps between said magnetic poles and the salient poles are set such that a small difference exists between a magnetic attractive force produced between the salient poles and said magnetic poles arranged along one circumferential half of said stator and acting in a radius direction of the rotor, and a magnetic attractive force produced between the salient pole and said magnetic poles arranged along another circumferential half of said stator and acting in the radius direction of the rotor.

13. A two-phase reluctance motor system including a direct current power supply and a rotor having salient poles, comprising:
a position detection device having two position detecting elements spaced from each other by an electrical angle of 90 degrees, for producing first to fourth position detection signals which are continuous but not superposed one upon another in time and which each have a width equivalent to an electrical angle of 90 degrees, in accordance with rotational positions of the salient poles of the rotor;
first and second exciting coils forming an exciting coil pair of a first phase and having first and second ends;
third and fourth exciting coils forming an exciting coil pair of a second phase and having first and second ends;
transistors respectively connected to the first and second ends of said first to fourth exciting coils;
a current supply control circuit for cyclically turning on said transistors in accordance with the first and fourth position detection signals, to supply an electric current to corresponding ones of said first to fourth exciting coils from the direct current power supply and thereby generate a unidirectional output torque of the motor;
diodes individually connected in a reverse direction and parallel to the connection of one of said first to fourth exciting coils and an associated one of said transistors;
a reverse current preventing diode connected between said current supply control circuit and the direct current power supply in a forward direction with respect to the direct current power supply;
a capacitor connected between said current supply control circuit and the direct current power supply and in parallel to the direct current power supply;
an armature to which said position detecting elements are secured, said position detecting elements each being arranged at a position such that said position detection device produces position detection signals able to make a current supply interval of each one of said first to fourth exciting coils coincident with a maximum torque generation interval;
energy storing means for storing the energy in a first one of said exciting coils when the current supply to said first one of said exciting coils is interrupted;
circuit means for, when one of said position detection signals is extinguished, cooperating with said reverse current preventing diode to prevent magnetic energy, stored in one of said exciting coils relating to said one of said position detection signals, from flowing back to the direct current power supply through said reverse current preventing diode, and causes the stored magnetic energy stored in said energy storing means to flow into another one of said exciting coils relating to another one of said position detection signals which is generated when said one of said position detection signals is extinguished, thereby eliminating a counter-torque caused by discharging the stored magnetic energy and a reduction of torque caused by a delayed rise of an exciting current flowing through another one of said exciting coils, to permit high-speed operation of the motor;
a diode connected between said current supply control circuit and the direct current power supply;
a semiconductor switching element inserted between said current supply control circuit and the direct current power supply; and
a chopper circuit for turning on and off said semiconductor switching element to control the exciting current flowing through each of said exciting coils to fall within a predetermined range.

14. A two-phase reluctance motor comprising:
a rotor having salient poles;
a position detection device having two position detection elements, for producing a first group of position detection signals which are continuous but not superposed one upon another in time and each of which have a width equivalent to an electrical angle of 180 degrees, and a second group of position detection signals which are continuous but not superposed one upon another in time and each of which have a width equivalent to an electrical angle of 90 degrees, in accordance with rotational positions of the salient poles of the rotor;

a first-phase exciting coil pair composed of first and second exciting coils having first and second ends;

a second-phase exciting coil pair composed of third and fourth exciting coils having first and second ends;

transistors respectively connected to said first and second ends of said first to fourth exciting coils;

a current supply control circuit for alternately turning on said transistors connected to said first and second exciting coils in accordance with said first group of position detection signals, and alternately turning on said transistors connected to said third and fourth exciting coils in accordance with said second group of position detection signals, to supply an electric current to corresponding ones of said first to fourth exciting coils from a direct current power supply and thereby generate a unidirectional output torque of the motor;

diodes respectively connected in parallel to the connections of said exciting coils and said transistors;

reverse current preventing diodes connected between said current supply control circuit and the direct current power supply;

capacitors connected between said current supply control circuit and the direct current power supply;

an armature having magnetic poles to which said first to fourth exciting coils are mounted, said position detecting elements each being secured at a position such that said position detection device produces a position detection signal able to start a current supply to each of said exciting coils at a rotational position of said rotor located at an arbitrary position where one of said salient poles enters a magnetic pole at a predetermined angle;

energy storing means for storing the energy in a first one of said exciting coils when the current supply to said first one of said exciting coils is interrupted;

circuit means which, when a first one of said position detection signals is extinguished, cooperates with said reverse current preventing diode to prevent magnetic energy, stored in a first one of said exciting coils receiving said first one of said position detection signals, from flowing back to the direct current power supply through said reverse current preventing diodes, and causes the stored magnetic energy stored in said energy storing means to flow into another one of said exciting coils receiving a second one of said position detection signals which is generated when said first one of said position detection signals is extinguished, thereby eliminating a counter-torque caused by discharging the stored magnetic energy and a reduction of torque caused by a delayed rise of an exciting current flowing through said another one of said exciting coils, to permit high-speed operation of the motor;

switching elements connected between said direct current power supply and said reverse current preventing diodes; and a chopper circuit for turning on and off said semiconductor switching elements to control the exciting current flowing through each of said exciting coils to fall within a predetermined range.

15. A three-phase reluctance motor including a rotor having salient poles, comprising:

a direct current power supply;

a position detection device having three position detecting elements spaced from each other by an angle of 120 degrees, for producing a first group of position detection signals which are continuous but not superposed one upon another in time, and a second group of position detections signals which are continuous but not superposed one upon another in time and each of which has a phase difference equivalent to an angle of 60 degrees with respect to corresponding ones of position detection signals of said first group, in accordance with rotational positions of the salient poles of the rotor;

a first-phase exciting coil pair including first and second exciting coils having first and second ends;

a second-phase exciting coil pair including third and fourth exciting coils having first and second ends;

a third-phase exciting coil pair including fifth and sixth exciting coils having first and second ends;

transistors respectively connected to both ends of said first to sixth exciting coils having first and second ends;

a current supply control circuit for cyclically turning on said transistors connected to said first, third and fifth exciting coils in accordance with said first group of position detection signals, and cyclically turning on said transistors associated with said second, fourth and sixth exciting coils in accordance with said second group of position detection signals, to supply an electric current to corresponding ones of said first to sixth exciting coils from said direct current power supply and thereby generate a unidirectional output torque of the motor;

diodes respectively connected in parallel to the connection of said exciting coils and said transistors;

reverse current preventing diodes connected between said current supply control circuit and said direct current power supply and in a forward direction with respect to said direct current power supply;

capacitors connected between said current supply control circuit and said direct current power supply and in parallel to said direct current power supply;

an armature to which said position detecting elements are secured, said position detecting elements being each secured at a position such that said position detection device produces a position detection signal able to make a current supply interval of each exciting coil coincident with a maximum torque generation interval;

energy storing means for storing the energy in a first one of said exciting coils when the current supply to said first one of said exciting coils is interrupted;

circuit means for, when one position detection signal is extinguished, cooperating with said reverse current preventing diode to prevent magnetic energy, stored in one of said exciting coils corresponding to a first one of said position detection signals, from flowing back to said direct current power supply through one of said diodes, and causes the stored magnetic energy stored in said energy storing means to flow into a second one of said exciting coils corresponding to a second one of said position detection signals generated when said first one of said position detection signals is extinguished, thereby eliminating a counter-torque caused by discharging stored magnetic energy and a reduction of torque caused by a delayed rise of an exciting current flowing through said second one of said exciting coils, to permit high-speed operation of the motor;

semiconductor switching elements connected between said direct current power supply and respective ones of said reverse current preventing diodes; and a chopper circuit for turning on and off said semiconductor switching elements to control the exciting current flowing through each of the exciting coils to fall within a predetermined range.

16. A three-phase reluctance motor including a rotor comprising:

a direct current power supply;

a position detection device having two position detecting elements spaced from each other by an electrical angel of (60+120 n) degrees (n being a positive integer) and including a position detection rotating member;

a detection portion including n sets of three detection members provided on a position detection rotating member synchronously rotatable with the rotor and each having a width equivalent to an electrical angle of 120 degrees, said position detection device producing a first group of position detection signals which are continuous but not superposed one upon another in time and each of which has a width equivalent to an electrical angle of 120 degrees, and a second group of position detection signals which are continuous but not superposed one upon another in time and each of which has a phase difference equivalent to an electrical angle of 60 degrees with respect to corresponding ones of the position detection signals of the first group, in accordance with a rotational position of the rotating member;

a first-phase exciting coil pair including first and second exciting coils;

a second-phase exciting coil pair including third and fourth exciting coils;

a third-phase exciting coil pair including fifth and sixth exciting coils;

transistors respectively connected to both ends of said first to sixth exciting coils;

a current supply control circuit having a direct current power supply side, for cyclically turning on transistors associated with said first, third and fifth exciting coils in accordance with the position detection signals of said first group of position detection signals, with cyclically turning on those transistors associated with said second, fourth and sixth exciting coils in accordance with said second group of position detection signals, to supply an electric current to corresponding ones of said first to sixth exciting coils from a direct current power supply and thereby generate a unidirectional output torque of the motor;

diodes connected in a forward direction between said direct current power supply and said current supply control circuit;

small-capacitance capacitors connected in parallel to the direct current power supply side of said current supply control circuit;

semiconductor switching elements connected between said direct current power supply and respective ones of said diodes;

energy storing means for storing the energy in a first one of said exciting coils when the current supply to said first one of said exciting coils is interrupted; and a chopper circuit for turning on and off said semiconductor switching elements to control the exciting current flowing through each of said exciting coils to fall within a predetermined range, said position detecting elements each being arranged at a position such that said position detection device produces a position detection signal for making a current supply interval of each of said exciting coils coincident with a maximum torque generation interval.

17. A three-phase reluctance motor according to claim 16, wherein said rotating member comprises a flat cup having a central portion secured to an upper end of a rotary shaft, said rotor having seven salient poles secured on an inner peripheral surface of said rotating member at equal distances, and said armature having magnetic poles to which said first to sixth exciting coils are respectively mounted and which are arranged at equal distances.

18. A three-phase reluctance motor according to claim 16 or 17, further comprising a speed detector for generating a signal representing a rotational speed of said rotating member, said chopper circuit controlling the exciting current flowing through each of said exciting coils in accordance with an output of said speed detector and a load on the motor, to thereby effect a constant-speed operation of the motor.

19. A two-phase reluctance motor having a rotor comprising:

a position detection device having two position detecting elements, for producing first to fourth position detection signals which are continuous but not superposed one upon another in time and which each have a width equivalent to an electrical angle of 90 degrees, in accordance with rotational positions of salient poles of the rotor;

first and second exciting coils forming a first-phase exciting coil pair;

third and fourth exciting coils forming a second-phase exciting coil pair;

transistors respectively connected to both ends of said first to fourth exciting coils;

a current supply control circuit for turning on said transistors respectively connected to said first, third, second and fourth exciting coils, in accordance with the first to fourth position detection signals;

a direct current power supply;

a reverse current preventing diode connected in a forward direction to said direct current power supply, for permitting an electric current to be supplied to said individual exciting coils from said direct current power supply;

an armature to which said position detecting elements are secured, said position detecting elements each being arranged at a position such that said position detection device produces a position detection signal able to make a current supply interval of each of said exciting coils coincident with a maximum torque generation interval;

energy storing means for storing the energy in a first one of said exciting coils when the current supply to said first one of said exciting coils is interrupted;

circuit means which, when one position detection signal is extinguished, cooperates with said reverse current preventing diode to prevent magnetic energy, stored in said first one of said exciting coils corresponding to a first one of said position detection signals, from flowing back to said direct current power supply, and causes the stored magnetic energy in said energy storing means to flow into a second one of said exciting coils corresponding to a second one of said position detection signals which is generated when said first one of said position detection signals is extinguished, to accelerate a rise and a fall of the exciting current flowing through the individual exciting coils, thereby suppressing a counter-torque and a reduction of torque and enabling use of a low-voltage power supply as said direct current power supply;

semiconductor switching elements connected between said direct current power supply and respective ones of said reverse current preventing diodes; and a chopper circuit for turning on and off said semiconductor switching elements to control the exciting current flowing through each of the exciting coils to fall within a predetermined range.

20. A three-phase reluctance motor including a rotor having salient poles, comprising:

a position detection device having three position detection elements, for producing first to third position detection signals which are continuous but not superposed one upon another in time and each of which has a width equivalent to an electrical angle of 120 degrees, and fourth to sixth position detection signals which are continuous but not superposed one upon another in time and each of which has a width equivalent to an electrical angle of 120 degrees and a phase difference equivalent to an electrical angle of 60 degrees with respect to a corresponding one of said first to third position detection signals, in accordance with rotational positions of the salient poles of the rotor;

first, second, third, fourth, fifth, and sixth exciting coils;

transistors respectively connected to both ends of said first to sixth exciting coils;

a current supply control circuit for turning on said transistors respectively associated with said first, third, fifth, second, fourth and sixth exciting coils, in accordance with said first to sixth position detection signals;

a direct current power supply;

reverse current preventing diodes connected between said direct current power supply and said current supply control circuit in a forward direction with respect to said direct current power supply, for permitting electric power to be supplied to said current supply control circuit from said direct current power supply;

an armature to which said position detecting elements are secured, said position detecting elements each being arranged at a position such that said position detection device produces a position detection signal able to make a current supply interval of each of said exciting coils coincident with a maximum torque generation interval;

energy storing means for storing the energy in a first one of said exciting coils when the current supply to said first one of said exciting coils is interrupted;

circuit means for, when one position detection signal is extinguished, cooperating with said reverse current preventing diode to prevent magnetic energy, stored in said first one of said exciting coils corresponding to a first one of said position detection signals, from flowing back to said direct current power supply, and causing the stored magnetic energy in said energy storing means to flow into a second one of said exciting coils corresponding to a second one of said position detection signals which is generated when said first one of said position detection signals is extinguished, to accelerate a rise and a fall of the exciting current flowing through individual exciting coils thereby suppressing a counter-torque and a reduction of torque and enabling use of a low-voltage power supply as said direct current power supply;

semiconductor switching elements connected between said direct current power supply and respective ones of said reverse current preventing diodes; and a chopper circuit for turning on and off said semiconductor switching elements to control the exciting current flowing through each of the exciting coils to fall within a predetermined range.

21. A three-phase reluctance motor including a rotor having salient poles, comprising:

a position detection device including three position detection elements, for producing first to third position detection signals which are continuous but not superposed one upon another in time and each of which has a width equivalent to an electrical angle of 120 degrees, in accordance with rotational positions of the salient poles of the rotor;

first, second and third exciting coils;

transistors respectively connected to both ends of said first to third exciting coils;

a current supply control circuit for turning on said transistors respectively connected to both ends of said first to third exciting coils, in accordance with said first to third position detection signals;

a direct current power supply;

a reverse current preventing diode connected between said direct current power supply and said current supply control circuit in a forward direction with respect to said direct current power supply, for permitting electric power to be supplied to said supply control circuit from said direct current power supply;

an armature to which said position detection elements are secured, said position detecting elements each being arranged at a position such that said position detection device produces a position detection signal able to make a current supply interval of said first to third exciting coils coincident with a maximum torque generation interval;

energy storing means for storing the energy in a first one of the exciting coils when the current supply to said first one of the exciting coils is interrupted;

circuit means for, when one position detection signal is extinguished, cooperating with said reverse current preventing diode to prevent magnetic energy, stored in a first one of said exciting coils corresponding to a first one of said position detection signals, from flowing back to said direct current power supply, and causing the stored magnetic energy in said energy storing means to flow into a second one of said exciting coils corresponding to a second position detection signal which is generated when said first one of said position detection signals is extinguished, to accelerate a rise and a fall of the exciting current flowing through said first to third exciting coils, thereby suppressing a countertorque and reduction of torque and enabling use of a low-voltage power supply as said direct current power supply;

semiconductor switching elements connected between said direct current power supply and respective ones of said reverse current preventing diodes; and a chopper circuit for turning on and off said semiconductor switching elements to control the exciting current flowing through each of the exciting coils to fall within a predetermined range.

* * * * *